United States Patent
Park

(10) Patent No.: US 12,536,108 B2
(45) Date of Patent: Jan. 27, 2026

(54) STORAGE DEVICE, OPERATION METHOD OF THE STORAGE DEVICE, AND ELECTRONIC SYSTEM INCLUDING THE STORAGE DEVICE

(71) Applicant: SAMSUNG ELECTRONICS CO., LTD., Suwon-si (KR)

(72) Inventor: Junbum Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 147 days.

(21) Appl. No.: 18/199,765

(22) Filed: May 19, 2023

(65) Prior Publication Data

US 2023/0409495 A1 Dec. 21, 2023

(30) Foreign Application Priority Data

May 20, 2022 (KR) .................. 10-2022-0062337

(51) Int. Cl.
| | |
|---|---|
| *G06F 13/00* | (2006.01) |
| *G06F 13/16* | (2006.01) |
| *G06F 13/18* | (2006.01) |
| *G06F 13/24* | (2006.01) |
| *G06F 3/06* | (2006.01) |
| *G06F 9/48* | (2006.01) |
| *G06F 9/54* | (2006.01) |
| *G06F 12/02* | (2006.01) |
| *G06F 12/0877* | (2016.01) |
| *G06F 13/26* | (2006.01) |

(52) U.S. Cl.
CPC .......... *G06F 13/1668* (2013.01); *G06F 13/18* (2013.01); *G06F 13/24* (2013.01); *G06F 3/0611* (2013.01); *G06F 3/0679* (2013.01); *G06F 9/48* (2013.01); *G06F 9/542* (2013.01); *G06F 12/0246* (2013.01); *G06F 12/0877* (2013.01); *G06F 13/26* (2013.01); *G06F 2213/0026* (2013.01)

(58) Field of Classification Search
None
See application file for complete search history.

(56) References Cited

U.S. PATENT DOCUMENTS

| | | |
|---|---|---|
| 8,554,968 B1 | 10/2013 | Onufryk et al. |
| 10,366,013 B2 * | 7/2019 | McFearin ............. G06F 12/126 |
| 10,387,081 B2 | 8/2019 | Benisty |
| 10,635,355 B1 | 4/2020 | Helmick et al. |
| 10,642,498 B2 | 5/2020 | Benisty et al. |
| 10,997,093 B2 | 5/2021 | Chang |
| 2017/0075834 A1 * | 3/2017 | Cha ....................... G06F 3/0655 |
| 2018/0113615 A1 | 4/2018 | Park |
| 2024/0184612 A1 * | 6/2024 | De Kort ................. G06Q 10/06 |

* cited by examiner

*Primary Examiner* — Midys Rojas
(74) *Attorney, Agent, or Firm* — Sughrue Mion, PLLC

(57) ABSTRACT

Provided are a storage device, an operation method of the storage device, and an electronic system including the storage device. The storage device includes a non-volatile memory device, and a storage controller configured to control the non-volatile memory device, execute a command from a host, select a location to which a completion entry for the command is to be written from among a memory and at least one cache of the host, and transmit, to the host, an interrupt including an interrupt vector number indicating the location to which the completion entry is to be written.

20 Claims, 17 Drawing Sheets

STORAGE DEVICE, OPERATION METHOD OF THE STORAGE DEVICE, AND ELECTRONIC SYSTEM INCLUDING THE STORAGE DEVICE

CROSS-REFERENCE TO RELATED APPLICATION

This application is based on and claims priority under 35 U. S. C. § 119 to Korean Patent Application No. 10-2022-0062337, filed on May 20, 2022, in the Korean Intellectual Property Office, the disclosure of which is incorporated by reference herein in its entirety.

BACKGROUND

The present disclosure relates to storage systems, and more particularly, to a storage device for posting a completion queue in a cache of a host system, an operation method of the storage device, and an electronic system including the storage device.

Direct cache access (DCA) is an information processing system protocol that allows data from an input/output device to be placed in a cache of a host system. DCA may be used to place data into a cache of a host system before, instead of, or while placing the data into a memory of the host system, and prevent access latency time and bandwidth limitations of a system memory by triggering data placement into a processor cache by using a prefetch hint.

SUMMARY

According to an aspect of an example embodiment, a storage device includes: a non-volatile memory device; and a storage controller configured to: control the non-volatile memory device, execute a command from a host, select a location to which a completion entry for the command is to be written from among a memory and at least one cache of the host, and transmit, to the host, an interrupt including an interrupt vector number indicating the location to which the completion entry is to be written.

According to an aspect of an example embodiment, a storage device includes: a non-volatile memory device; and a storage controller configured to: control the non-volatile memory device, execute a command from a host, transmit, to the host, a completion entry packet that includes location information for a location to which a completion entry for the command is to be written among a memory and at least one cache of the host and the completion entry, and transmit, to the host, an interrupt packet including caching information indicating whether the completion entry has been cached in one of the at least one cache.

According to an aspect of an example embodiment, an electronic system includes: a host including a processor and a memory, the processor including a plurality of cores and at least one cache; and a storage device including a non-volatile memory, wherein the storage device is configured to: execute a command from the host, select a location to which a completion entry for the command is to be written from among the memory and the at least one cache, and transmit, to the host, an interrupt including an interrupt vector number allocated to a completion queue included in the location to which the completion entry is to be written.

BRIEF DESCRIPTION OF THE DRAWINGS

The above and/or other aspects will be more clearly understood from the following detailed description taken in conjunction with the accompanying drawings in which.

DETAILED DESCRIPTION

Embodiments will now be described more fully with reference to the accompanying drawings.

Figure 1:
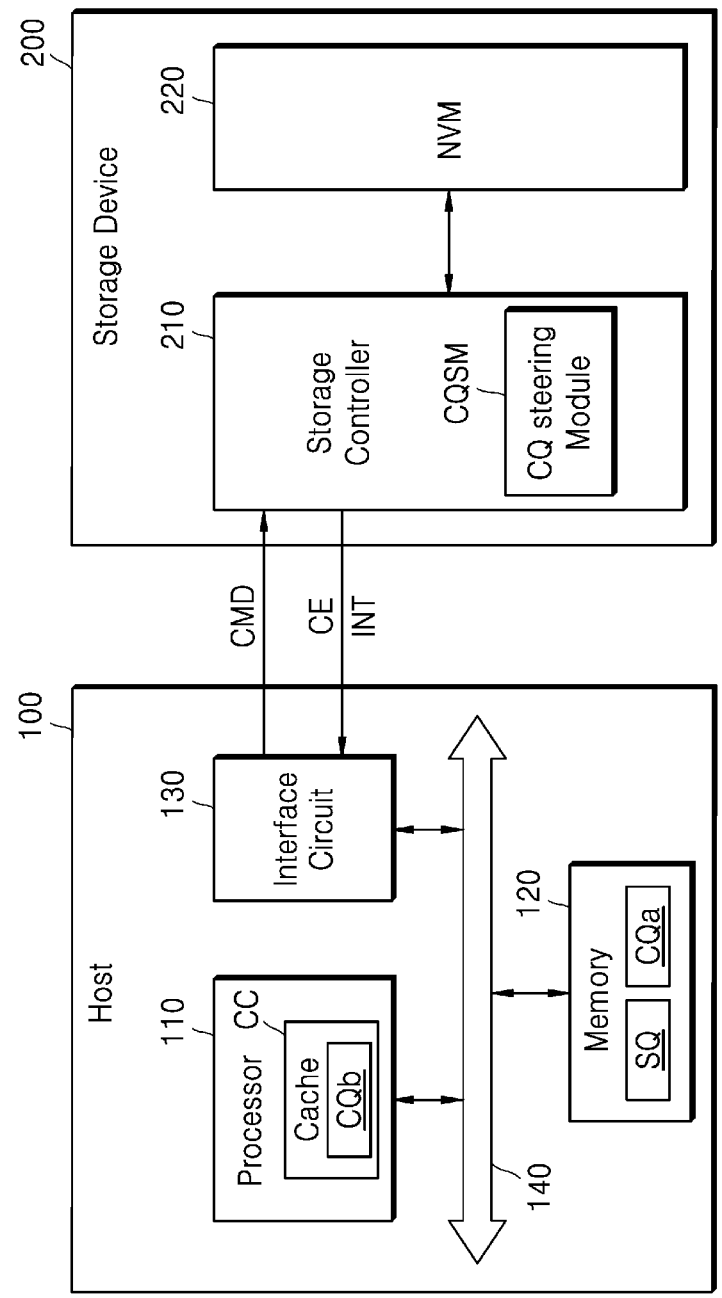
FIG. 1 is a schematic block diagram of an electronic system according to an embodiment.

FIG. 1 is a schematic block diagram of an electronic system 10 according to an embodiment.

The electronic system 10 may be embedded in an electronic device or may be implemented as an electronic device. The electronic device may be implemented as, for example, a personal computer (PC), a data server, an ultra mobile PC (UMPC), a workstation, a netbook, a network-attached storage (NAS), a smart television, an Internet of Things (IoT) device, or a portable electronic apparatus. The portable electronic apparatus may be a laptop computer, a mobile telephone, a smartphone, a tablet PC, a personal digital assistant (PDA), an enterprise digital assistant (EDA), a digital still camera, a digital video camera, an audio player, a portable multimedia player (PMP), a personal navigation device (PND), an MP3 player, a handheld game console, an e-book, a wearable apparatus, or the like.

Referring to FIG. 1, the electronic system 10 may include a host 100 and a storage device 200.

The host (or host system) 100 manages all operations of the electronic system 10. The host 100 may store data in the storage device 200 and may read data from the storage device 200. The host 100 may transmit a command CMD to the storage device 200. For example, the host 100 may transmit a write command and write data to the storage device 200 or may transmit a read command to the storage device 200. The storage device 200 may execute the command CMD, and may transmit a completion entry CE according to the execution completion to the host 100. The completion entry CE may include information about processing of the command CMD, such as whether the command CMD has been successfully executed or whether an error has occurred during execution of the command CMD. The completion entry CE may be posted in a memory 120 and/or a cache CC of the host 100. The storage device 200 may transmit an interrupt INT informing posting of the completion entry CE to the host 100.

The host 100 may include a processor 110, the memory 120, and an interface circuit 130. The processor 110, the memory 120, and the interface circuit 130 may communicate with each other through a system bus 140.

The processor 110 may be implemented as a central processing unit (CPU), a processor, a microprocessor, or an application processor (AP). According to an embodiment, the processor 110 may be implemented as a system-on-chip (SoC).

The processor 110 may execute various pieces of software (application programs, operating systems (OSs), file systems, and device drivers) loaded into the memory 120. The processor 110 may include same types of multiple cores or different types of multiple cores.

The processor 110 may include the cache CC. For example, the cache CC may include a cache (for example, an L2 cache) dedicated for each of the multiple cores and a cache (for example, an L3 cache) shared by the multiple cores.

An application program or data to be processed by the processor 110 may be loaded into the memory 120. The memory 120 may temporarily store data that is processed according to processing by the processor 110. The memory 120 may be referred to as a system memory. The memory 120 may be implemented as a volatile memory or a non-volatile memory. Examples of the volatile memory may include dynamic random access memory (DRAM) and static RAM (SRAM). Examples of the non-volatile memory may include resistive memories, such as Resistive RAM (Re-RAM), Phase-change RAM (PRAM), and Magnetoresistive RAM (MRAM).

In the electronic system 10 according to an embodiment, a submission queue SQ may be included in the memory 120 of the host 100, and completion queues CQa and CQb paired with the submission queue SQ may be included in the memory 120 and the cache CC, respectively. Although the completion queues CQa and CQb are included in physically different locations, for example, the memory 120 and the cache CC in FIG. 1, the completion queues CQa and CQb may logically correspond to one completion queue because the completion queues CQa and CQb are paired with the one submission queue SQ. According to an embodiment, an interrupt vector number may be allocated to each of the completion queues CQa and CQb.

The completion queues CQa and CQb paired with the one submission queue SQ are queues that are written by the host 100 and thus may correspond to commands to be transmitted to the storage device 200. The submission queue SQ may be written or supplied by the host 100, and may be consumed by the storage device 200. The completion queue CQ, which is a queue of completion entries CE written by the storage device 200, indicates whether a command requested by the host 100 has been completed. The completion queues CQa and CQb may be written by the storage device 200 and consumed by the host 100.

In an initialization phase, the host 100 may generate one or more submission queues and one or more completion queues that are paired with the one or more submission queues. For example, each completion queue may be paired with one submission queue or with a plurality of submission queues SQ.

The submission queue SQ and the completion queue CQa may be assigned regions of the memory 120, and the completion queue CQb may be assigned a region of the cache CC. The host 100 may inform the storage device 200 of the submission queue SQ and the completion queues CQa and CQb by transmitting queue information, such as a base address, a depth, and the like of each queue, to the storage device 200. The storage device 200 may execute the command CMD from the submission queue SQ, based on the queue information, or may post the completion entry CE to the completion queues CQa and CQb.

The interface circuit 130 provides a physical connection between the host 100 and the storage device 200. A protocol of the interface circuit 130 may be at least one of a Universal Serial Bus (USB) protocol, a Small Computer System Interface (SCSI) protocol, a PCI express protocol, an ATA protocol, a Parallel ATA (PATA) protocol, a Serial ATA (SATA) protocol, and a Serial Attached SCSI (SAS) protocol.

The interface circuit 130 may convert commands CMD, addresses, and data corresponding to various access requests issued by the host 100 according to a protocol with the storage device 200, and may provide the converted commands CMD, addresses, data to the storage device 200.

The interface circuit 130 may receive various response signals, for example, the completion entry CE and the interrupt INT, from the storage device 200, and may provide the completion entry CE and the interrupt INT to a component corresponding to each of the completion entry CE and the interrupt INT from among the components of the host 100, for example, the processor 110, the cache CC, and the memory 120. For example, the interface circuit 130 may transmit the completion entry CE to the completion queue CQa in the memory 120 and/or to the completion queue CQb in the cache CC. For example, the interface circuit 130 may provide the interrupt INT to a core included in the processor 110.

The storage device 200 may access the nonvolatile memory device (NVM) 220 in response to the command CMD provided from the host 100, or may perform various requested operations. The storage device 200 may execute the command CMD, generate the completion entry CE and the interrupt INT when the execution of the command CMD is completed, and transmit the completion entry CE and the interrupt INT to the host 100 according to a set protocol.

The storage device 200 may include a storage controller 210 and the NVM 220. According to an embodiment, the storage device 200 may be a non-volatile memory express (NVMe)-based solid state drive (SSD) using a cache direct access (CDA) of a PCIe (Peripheral Component Interconnect Express) interface.

The NVM 220 may store data. In other words, the NVM 220 may store data received from the host 100. The NVM 220 may include a memory cell array including non-volatile memory cells capable of retaining stored data even when the power of the storage device 200 is cut off, and the memory cell array may be divided into a plurality of memory blocks. The plurality of memory blocks may have a two-dimensional (2D) horizontal structure in which memory cells are two-dimensionally arranged on the same plane (or layer) or a three-dimensional (3D) vertical structure in which non-volatile memory cells are three-dimensionally arranged. A memory cell may be a single level cell (SLC) storing one bit of data, or a multi-level cell (MLC) capable of storing at least two bits of data. However, embodiments are not limited thereto, and each memory cell may be a triple level cell (TLC) for storing 3-bit data or a quadruple level cell (QLC) for storing 4-bit data.

According to some embodiments, the NVM 220 may include a plurality of dies each including a memory cell array or a plurality of chips each including a memory cell array. For example, the NVM 220 may include a plurality of chips, each of which may include a plurality of dies. According to an embodiment, the NVM 220 may include a plurality of channels each including a plurality of chips.

According to an embodiment, the NVM 220 may be a NAND flash memory device. However, embodiments are not limited thereto, and the NVM 220 may be implemented as resistive memory devices, such as ReRAMs, PRAMs, or MRAMs.

The storage controller 210 may control the overall operation of the storage device 200. When power is applied to the storage device 200, the storage controller 210 may execute firmware. When the NVM 220 is a NAND flash memory device, the storage controller 210 may execute firmware such as a flash translation layer (FTL) for controlling communication between the host 100 and the NVM 200. For example, the storage controller 210 may receive data and a logical block address (LBA) from the host 100, and may connect the LBA to a physical block address (PBA). The PBA may indicate the address of a memory cell in which data is to be stored among the memory cells included in the NVM 220.

In response to a command for requesting writing/reading from the host 100, the storage controller 210 may control the NVM 220 such that data is read from the NVM 220 or programmed to the NVM 220.

According to an embodiment, the storage controller 210 may include a CQ steering module CQSM. When execution of the command CMD is completed, the CQ steering module CQSM may select a location (for example, a posting location) to which the completion entry CE according to the command CMD is to be written (stored), among the memory 120 and the at least one cache CC included in the host 100. According to an embodiment, the CQ steering module CQSM may select a location to which the completion entry CE is to be posted, among the memory 120 and the at least one cache CC, based on latency according to the time for processing the completion entry CE.

The storage controller 210 may post the completion entry CQ to the completion queue CQa or CQb disposed at the selected location, and may transmit an interrupt INT including information indicating the selected location, for example, caching information, to the host 100. The completion entry CQ and the interrupt INT may be implemented as packets generated based on a communication protocol established between the host 100 and the storage device 200. The packet including the completion entry CQ may be referred to as a completion entry packet, and the packet including the interrupt INT may be referred to as an interrupt packet. The completion entry packet may include location information indicating a location to which the completion entry CE is written, and the interrupt packet may include, as caching information, an interrupt vector number allocated to the completion queue CQa or CQb to which the completion entry CE is posted.

An operation, performed by the storage controller 210, of selecting the location to which the completion entry CE is to be posted, among the memory 120 and the at least one cache CC, posting the completion entry CE to the completion queues CQa and CQb included in the selected location, and generating the interrupt INT indicating the selected location will now be described in detail with reference to FIGS. 2 through 10.

The host 100 may prevent occurrence of a bottleneck in processing of completion entries by adjusting the priority of the completion entry processing, based on the interrupt vector number, that is, the location information indicating the location where the completion entry CE is stored, may provide a segmented response time for input/output, and may optimize input/output latency. Accordingly, processing performance of the storage device 200 and the electronic system 10 may be improved.

Figure 2:
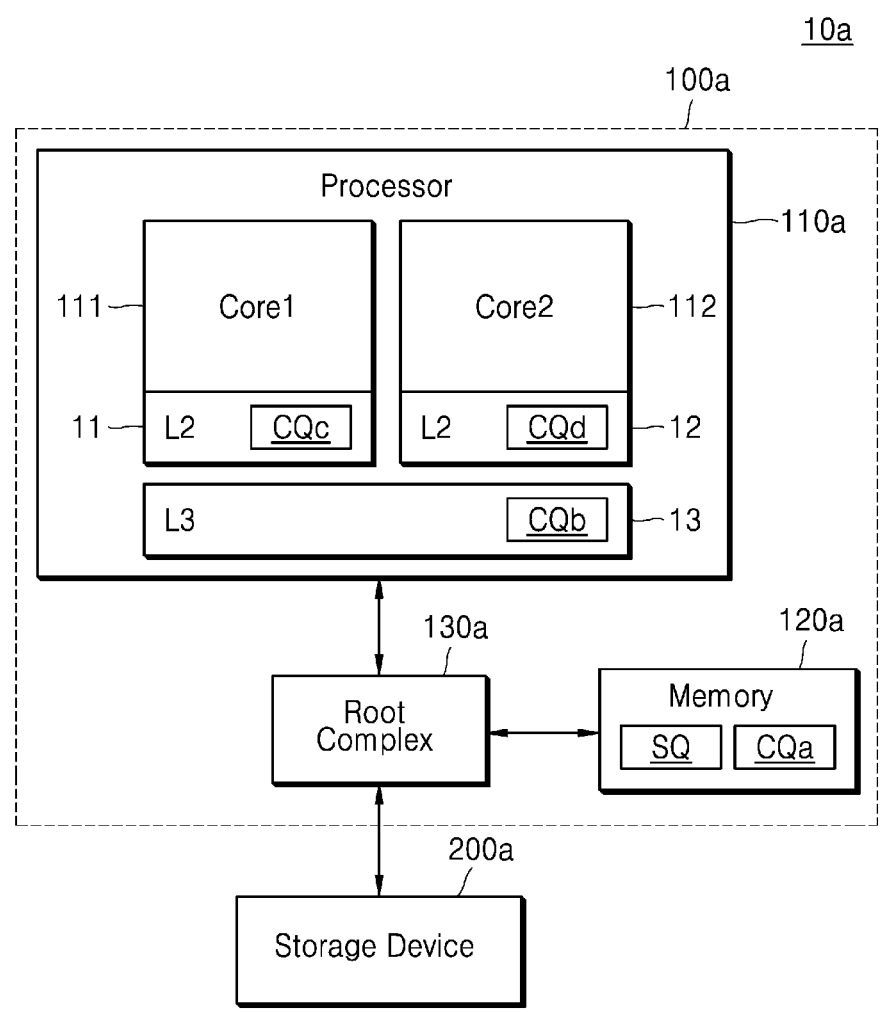
FIG. 2 is a block diagram of an electronic system according to an embodiment.

FIG. 2 is a block diagram of an electronic system 10a according to an embodiment.

Referring to FIG. 2, the electronic system 10a may include a host 100a and a storage device 200a, and the host 100a may include a processor 110a, a memory 120a, and a root complex 130a. According to an embodiment, the processor 110a, the memory 120a, and the root complex 130a may be implemented as separate semiconductor chips. According to another embodiment, the processor 110a and the memory 120a, or the processor 110a and the root complex 130a may be integrated into a single semiconductor chip. According to an embodiment, the host 100a and the storage device 200a may communicate with each other via a PCIe interface-based bus.

The processor 110a may include a plurality of cores, for example, a first core 111 and a second core 112, and the first core 111 and the second core 112 may include dedicated caches, for example, L2 caches 11 and 12, respectively. The first core 111 and the second core 112 may share a sharing cache, for example, an L3 cache 13. Completion queues CQc, CQd, and CQb may be arranged in the L2 caches 11 and 12 and the L3 cache 13, respectively. In other words, respective partial regions of the L2 caches 11 and 12 and the L3 cache 13 may be used as completion queues.

The memory 120a may include, for example, DRAM. The memory 120a may include a submission queue SQ and a completion queue CQa paired with the submission queue SQ. The completion queue CQb included in the L3 cache 13 and the completion queue CQc or CQd included in the L2 cache 11 or 12 may be considered as a single completion queue together with the completion queue CQa included in the memory 120a, and may be paired with the submission queue SQ.

The root complex 130a connects a sub-system including the processor 110a and the memory 120a to the storage device 200a. Communication between the root complex 130a and the storage device 200a may follow an NVMe protocol, based on transaction layer packets (TLPs).

The root complex 130a may transmit and receive signals transmitted between the host 100a and the storage device 200a, for example, a completion entry and an interrupt, in the form of a packet, and may transmit the signals to a destination based on location information indicating a destination to which a signal, including the header, is to be transmitted from the header of the packet.

The root complex 130a may transmit a command written to the submission queue SQ to the storage device 200a. The root complex 130a may receive the completion entry from the storage device 200a, and may transmit the completion entry to a completion queue at a location indicated by location information included in the completion entry among the L2 cache 11 or 12, the L3 cache 13, and the memory 120a. The completion entry may be written to the completion queue included in the location.

According to an embodiment, when the completion entry is written to the L2 cache 11 or 12 or the L3 cache 13, namely, when the completion entry is cached, the root complex 130a may also write the completion entry to the completion queue CQa of the memory 120a.

The root complex 130a may transmit the interrupt to a core corresponding to the location information, for example, the first core 111 or the second core 112, based on location information included in the interrupt received from the storage device 200a. The interrupt may include an interrupt vector number allocated to the completion queue in which the completion entry is stored. The core corresponding to the interrupt may determine whether the completion entry has been cached and in which cache the completion entry has been cached, based on the interrupt vector number, and may determine the priority processing order of interrupts.

The storage device 200a may be implemented as an NVMe SSD using a PCIe bus-based cache direct memory access (CDMA). The NVMe is a communication standard for storage devices based on a PCIe interface, and may define a command set and a function set for a PCIe-based SSD. The storage device 200a may execute the command received from the host 100a, may generate the completion entry when an operation according to the command is completed, may determine a location to which the completion entry is to be written among the memory 120a and the at least one cache, for example, the L2 cache 11 or 12 and the L3 cache 13, and may post the completion entry to the determined location. The storage device 200a may generate an interrupt vector including the interrupt vector number allocated to the completion entry at the location to which the completion queue is written, and may transmit the generated interrupt vector to the host 100a.

Figure 3:
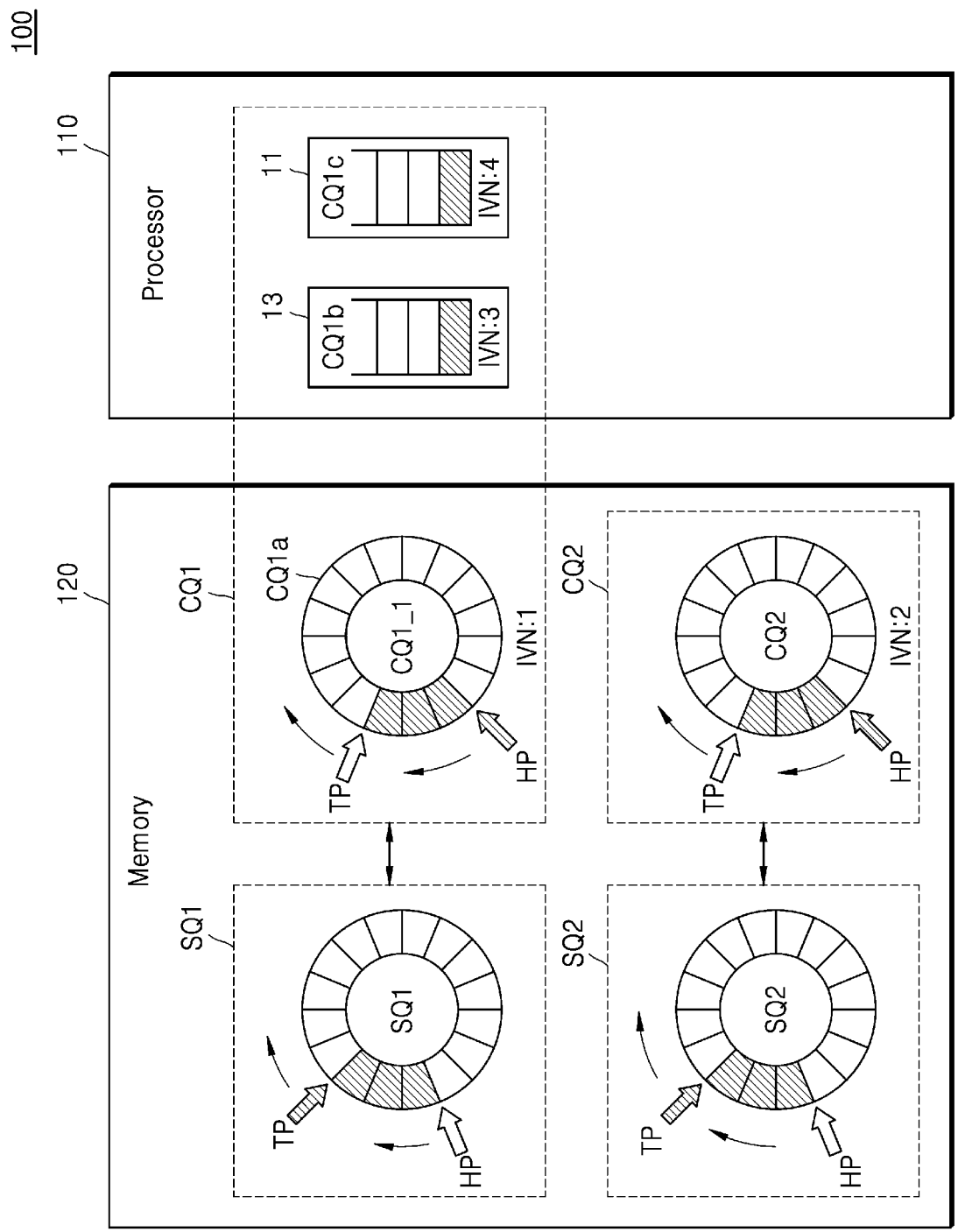
FIG. 3 illustrates a submission queue and a completion queue included in a host according to an embodiment.

FIG. 3 illustrates a submission queue and a completion queue included in a host according to an embodiment.

Referring to FIG. 3, the host 100 may generate one or more submission queues, namely, first and second submission queues SQ1 and SQ2, and one or more completion queues, namely, first and second completion queues CQ1 and CQ2, corresponding to the one or more submission queues SQ1 and SQ2 in an initialization stage. For example, the first submission queue SQ1 and the first completion queue CQ1 may be paired with each other, and the second submission queue SQ2 and the second completion queue CQ2 may be paired with each other. In FIG. 3, one submission queue (for example, SQ1) and one completion queue (for example, CQ1) are paired with each other. However, embodiments are not limited thereto, and a plurality of submission queues may be paired with one completion queue.

The command generated by the host 100 may be written to the first and second submission queues SQ1 and SQ2, a memory (120 of FIG. 1 or 120a of FIG. 2) may execute the command on the first and second completion queues CQ1 and CQ2, and a completion entry generated based on completion of the command may be written.

The first submission queue SQ1 and the second submission queue SQ2 may be arranged in the memory 120. The first completion queue CQ1 paired with the first submission queue SQ1 may include a completion queue CQ1a (hereinafter, referred to as a first queue) arranged in the memory 120 and one or more completion queues CQ1b and CQ1c (hereinafter, referred to as a second queue and a third queue, respectively) arranged in the processor 110. For example, the second queue CQ1b may be arranged in the L3 cache 13, and the third queue CQ1c may be arranged in the L2 cache 11 dedicated to a core, for example, the first core 111 of FIG. 2. In FIG. 3, the second queue CQ1b and the third queue CQ1c are respectively arranged in the L3 cache 13 and the L2 cache 11. However, embodiments are not limited thereto, and a completion queue may be arranged in the L3 cache 13, or a completion queue may be arranged in the L2 cache 11.

The first queue CQ1a, the second queue CQ1b, and the third queue CQ1c are arranged in physically different locations, but may be included in one completion queue paired with the first submission queue SQ1, namely, the first completion queue CQ1.

The second completion queue CQ2 paired with the second submission queue SQ2 may be arranged in the memory 120. However, embodiments are not limited thereto, and, similar to the first completion queue CQ1, the second completion queue CQ2 may include at least two queues respectively included in the memory 120 and the processor 110.

An interrupt vector number IVN may be allocated to each of the first and second completion queues CQ1 and CQ2. For example, when the host 100 generates the first and second completion queues CQ1 and CQ2 in an early stage, the host 100 may allocate the interrupt vector number INV to each of the first and second completion queues CQ1 and CQ2. Different interrupt vector numbers may be allocated to the first queue CQ1a, the second queue CQ1b, and the third queue CQ1c included in the first completion queue CQ1, respectively. For example, as shown in FIG. 3, '1', '3' and '4' may be allocated as interrupt vector numbers INV to the first queue CQ1a, the second queue CQ1b, and the third queue CQ1c, and '2' may be allocated as an interrupt vector number INV to the second completion queue CQ2.

According to an embodiment, a depth of the first submission queue SQ1 may be equal to that of the first completion queue CQ1, and a depth of the second submission queue SQ2 may be equal to that of the second completion queue CQ2. According to an embodiment, a depth of the first queue CQ1a included in the first completion queue CQ1 may be equal to that of the first submission queue SQ1. Alternatively, a sum of the depths of the first queue CQ1a, the second queue CQ1b, and the third queue CQ1c included in the first completion queue CQ1 may be equal to the depth of the first submission queue SQL As described above with reference to FIG. 1, the first and second submission queues SQ1 and SQ2 are written or supplied by the host 100, and consumed by the storage device 200 of FIG. 1. In other words, respective tail pointers TP of the first and second submission queues SQ1 and SQ2 may be advanced by the host 100 writing the command. The locations of the tail pointers TP may be transmitted to the storage device 200. The host 100 may transmit to the storage device 200 a tail doorbell indicating that a new command has been recorded in the first and second submission queue SQ1 or SQ2. The storage device 200 may fetch the command from the first or second submission queue SQ1 or SQ2, and may execute the command.

The storage device 200 may advance a head pointer HP of the first submission queue SQ1 by executing the command and providing a completion entry indicating completion of execution to the first or second completion queue CQ1 or CQ2.

The first and second completion queues CQ1 and CQ2 are written by the storage device 200 and are consumed by the host 100. Respective tail pointers TP of the first and second completion queues CQ1 and CQ2 may be advanced by the storage device 200 writing the completion entry. When an interrupt corresponding to the completion entry is transmitted from the storage device 200, the host 100 may perform an internal operation for completing all processing procedures for commands written to the first and second submission queues SQ1 and SQ2, advance the head pointers HP of the first and second completion queues CQ1 and CQ2 in response to the interrupt, and transmit the location of a new head pointer TP to the storage device 200. Notification of the head pointer HP by the host 100 to the storage device 200 may be achieved by filling the head pointer HP to a doorbell register (not shown) of the storage device 200.

When the processor 110 of FIG. 1 processes completion of the command, the processor 110 may search for the completion queue from the host 100 in response to the interrupt INT. As described above, the completion queue, for example, the first completion queue CQ1, may be arranged in at least one cache, for example, the L2 cache 11, the L3 cache 13, and the memory 120. When one interrupt vector number is allocated to one completion queue, the core (111 of FIG. 2) has difficulties in determining the location of the completion queue to which the completion entry has been written, based on the interrupt. When the completion entry exists in a cache, such as the L2 cache 11 or the L3 cache 13, and is then extracted and processed when placed in the memory 120, additional latency is generated in command processing. An increase in input/output latency may cause a degradation in the performance of an electronic system.

However, because the electronic system 10 of FIG. 1 according to an embodiment allocates different interrupt vector numbers to the first queue CQ1$a$, the second queue CQ1$b$, and the third queue CQ1$c$ included in the first completion queue CQ1, respectively, and the interrupt including the interrupt vector number corresponding to the queue to which the completion entry has been written is provided to the core of the processor 110, the core may determine the location where the completion entry has been stored, based on the interrupt vector number, and may preferentially process the cached completion entry. Accordingly, the input/output latency may be optimized.

Figure 4A:
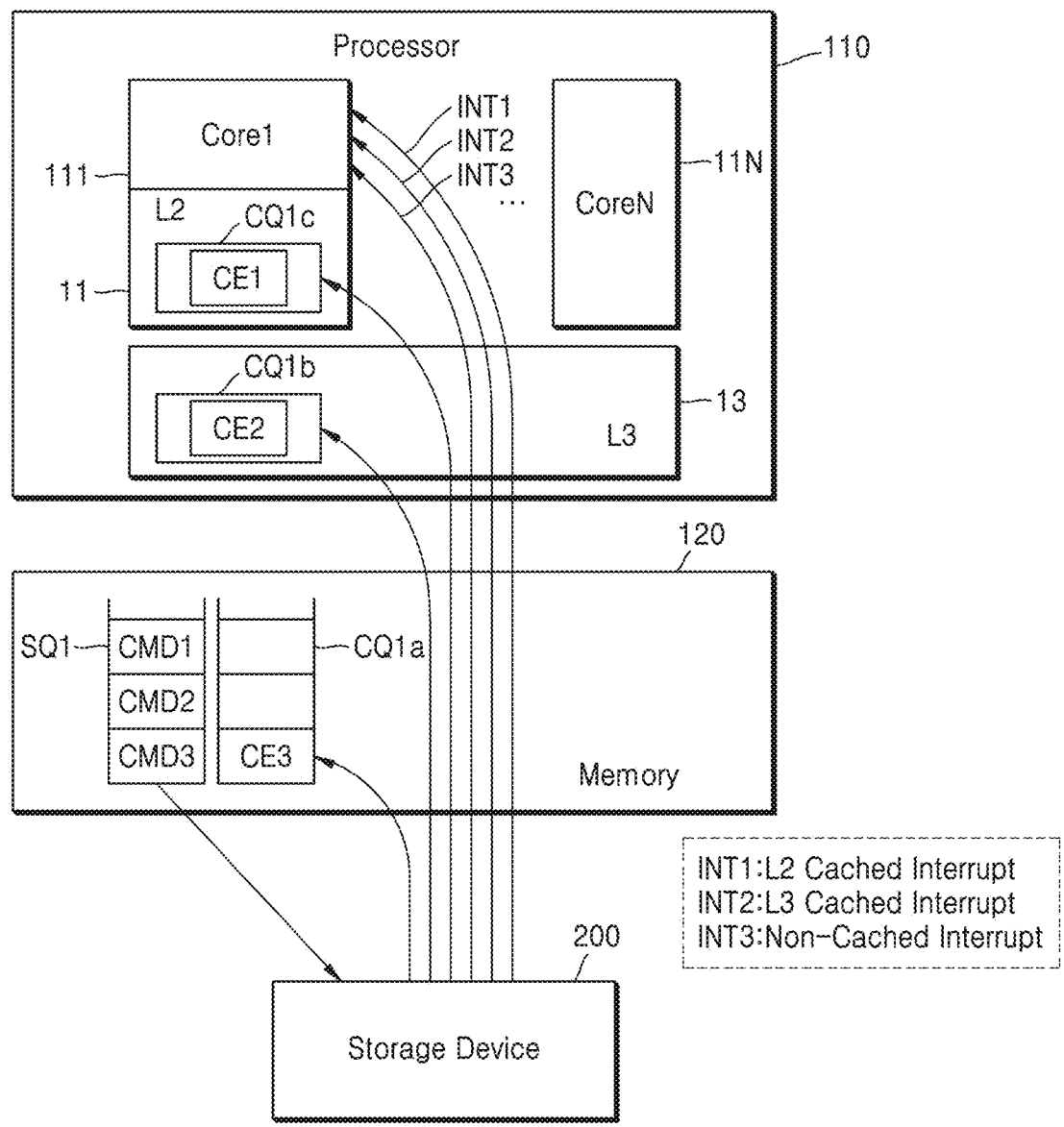
FIGS. 4A and 4B illustrate a method, performed by a storage device according to an embodiment, of posting a completion entry and transmitting an interrupt.
Figure 4B:
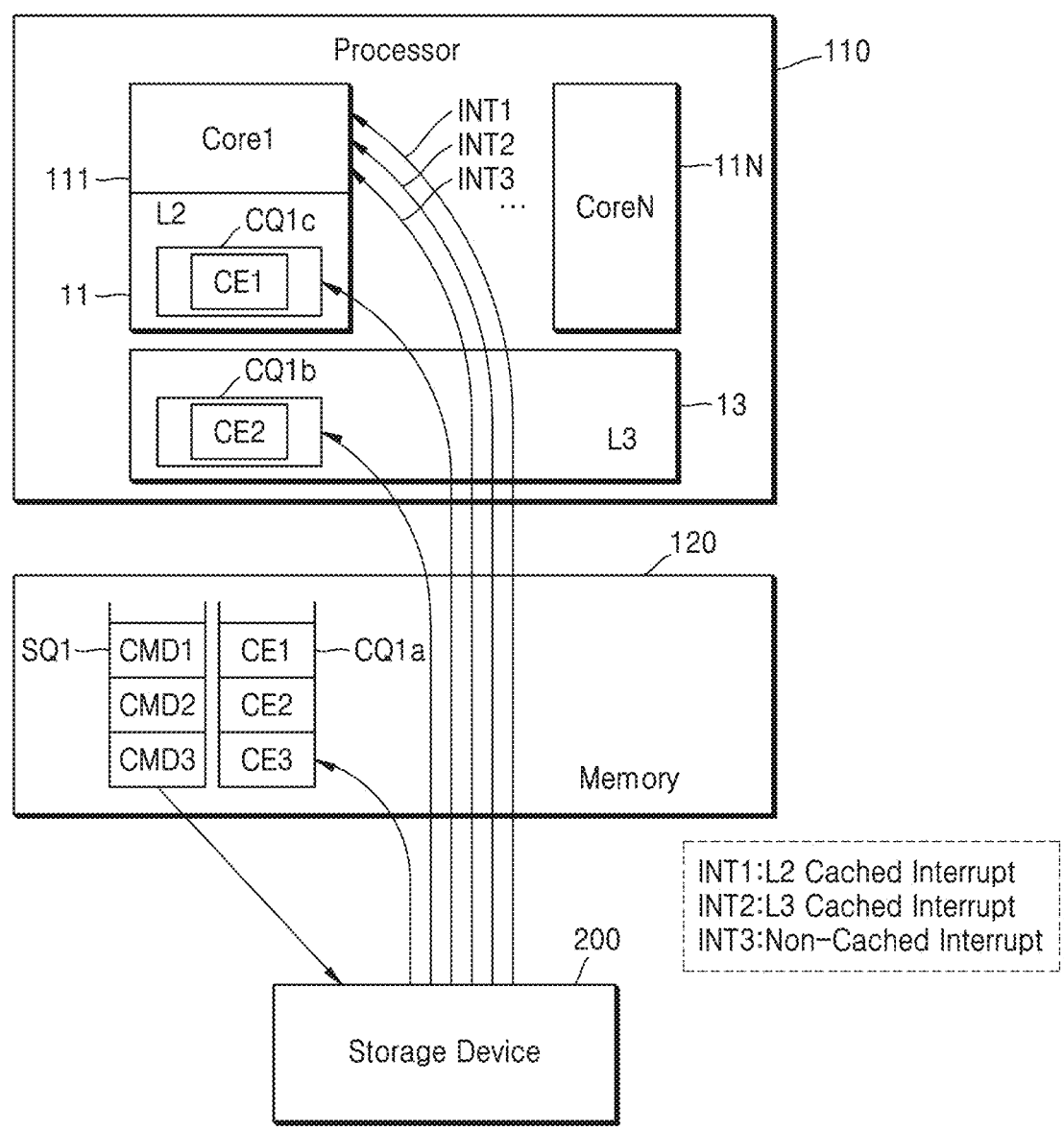

FIGS. 4A and 4B illustrate a method, performed by a storage device according to an embodiment, of posting a completion entry and transmitting an interrupt.

Referring to FIGS. 4A and 4B, the processor 110 may include a plurality of cores, for example, first through N-th cores 111 through 11N, and the plurality of cores may include a dedicated cache, for example, the L2 cache 11. The plurality of cores may share the L3 cache 13. In FIGS. 4A and 4B, the first through N-th cores 111 through 11N are illustrated as sharing one L3 cache 13. However, embodiments are not limited thereto, and the processor 110 may include a plurality of L3 caches 13, and some of the first through N-th cores 111 through 11N may share one L3 cache 13 and some other cores may share another L3 cache 13.

First completion queues, for example, the first queue CQ1$a$, the second queue CQ1$b$, and the third queue CQ1$c$, paired with the first submission queue SQ1 may be arranged in the memory 120, the L3 cache 13, and the L2 cache 12 of the first core 111, respectively.

The storage device 200 may sequentially read commands, for example, a first command CMD1, a second command CMD2, and a third command CMD3, from the first submission queue SQ1, and may execute the first command CMD1, the second command CMD2, and the third command CMD3.

When the command execution is completed, the storage device 200 may post a completion entry to a completion queue. For example, the storage device 200 may post a first completion entry CE1 to the third queue CQ1$c$ arranged in the L2 cache 11, post a second completion entry CE2 to the second queue CQ1$b$ arranged in the L3 cache 13, and post a third completion entry CE3 to the first queue CQ1$a$ arranged in the memory 120.

According to an embodiment as shown in FIG. 4B, when completion entries are posted to the second queue CQ1$b$ arranged in the L3 cache 13 and the third queue CQ1$c$ arranged in the L2 cache 11, the completion entries may also be posted to the first queue CQ1$a$ arranged in the memory 120. For example, the first completion entry CE1 may be posted to the first queue CQ1$a$ simultaneously with or after being posted to the third queue CQ1$c$. In other words, when a completion entry is cached, the completion entry may be written to the memory 120.

After posting a completion entry to a completion queue, the storage device 200 may transmit an interrupt to a core, for example, the first core 111. The interrupt may include caching information indicating whether the completion entry has been cached and in which cache the completion entry has been cached. For example, the storage device 200 may transmit, to the first core 111, a first interrupt INT1 indicating that the first completion entry CE1 has been cached in the L2 cache, may transmit, to the first core 111, a second interrupt INT2 indicating that the second completion entry CE2 has been cached in the L3 cache, and may transmit, to the first core 111, a third interrupt INT3 indicating that the third completion entry CE3 has not been cached and has been written to the memory 120.

According to an embodiment, the caching information may include an interrupt vector number. As described above with reference to FIG. 3, different interrupt vector numbers may be allocated to completion queues, for example, the first queue CQ1$a$, the second queue CQ1$b$, and the third queue CQ1$c$, respectively. The interrupt may include an interrupt vector number allocated to the completion queue to which the completion entry has been written. The first core 111 may determine whether the completion entry has been cached and in which cache the completion entry has been cached, based on the interrupt vector number included in the interrupt.

For example, the first interrupt INT1 may include an interrupt vector number allocated to the third completion queue CQ1$c$ of the L2 cache 11 to which the first completion entry CE1 has been written, and the first core 111 may determine that the first completion entry CE1 has been cached in the L2 cache 11, based on the interrupt vector number of the first interrupt INT1, and may read the first completion entry CE1 from the third completion queue CQ1$c$ included in the L2 cache 11.

The first core 111 may determine whether the completion entry has been cached and in which cache the completion entry has been cached, based on the interrupt vector number, and may adjust the priority of the completion entry. For example, the first core 111 may process completion entry CE1 or the second completion entry CE2, in preference to a non-cached completion entry, for example, the third completion entry CE3. When the cached completion entry is evicted without being processed and located in the memory 120 and then processed, latency may increase, compared with when the completion entry is processed when being cached. Thus, the first core 111 may reduce the completion latency of a command corresponding to the cached completion entry by preferentially processing the cached completion entry.

For convenience of explanation, FIGS. 4A and 4B illustrates the first submission queue SQ1 and the first queue CQ1$a$, the second queue CQ1$b$, and the third queue CQ1$c$ of the first completion queue, which are associated with the first core 111, and completion entry posting and an interrupt associated with them have already been described as above. However, the above description is also applicable to other cores.

Figure 5:
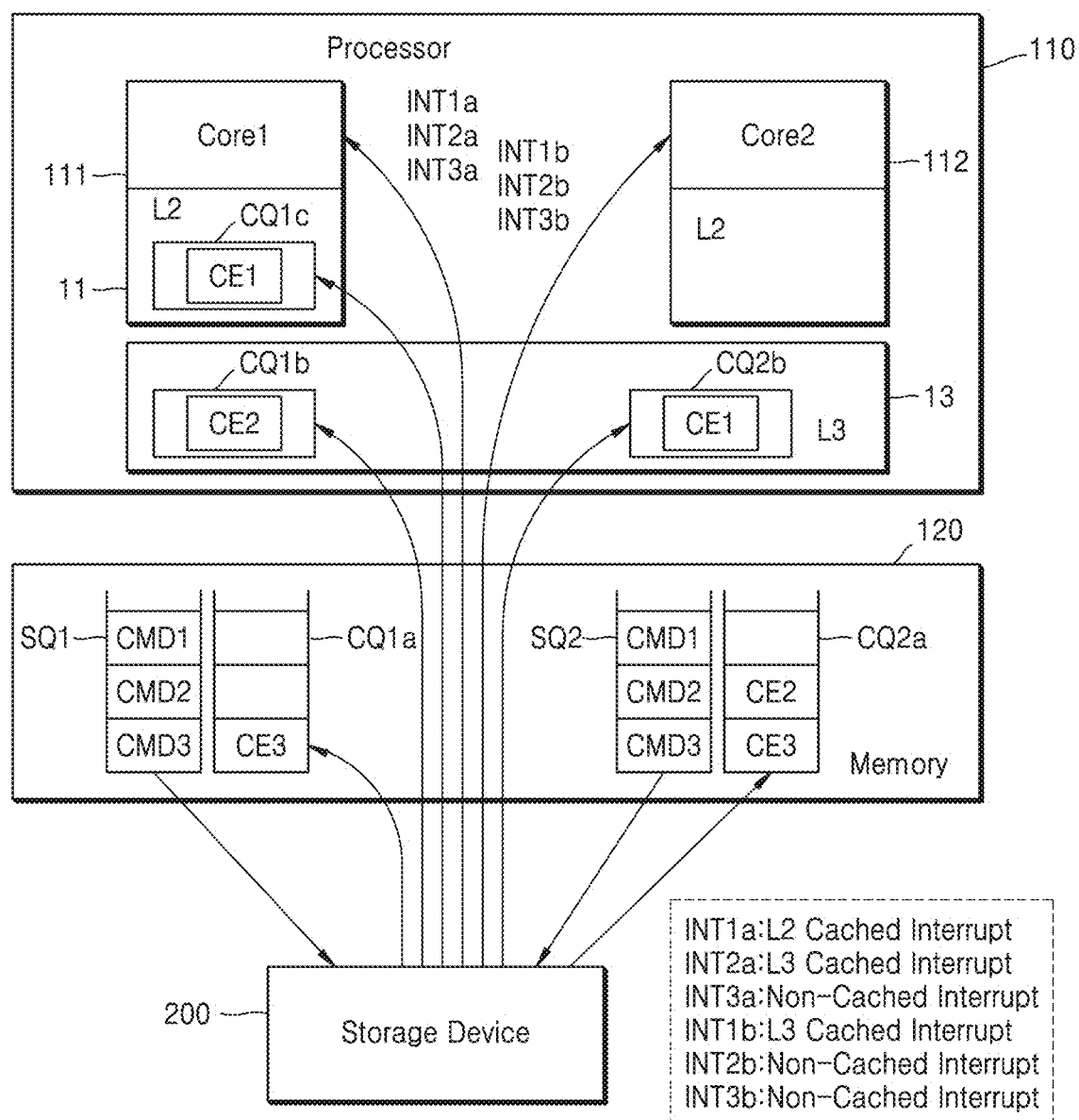
FIG. 5 illustrates a method, performed by a storage device according to an embodiment, of posting a completion entry and transmitting an interrupt.

FIG. 5 illustrates a method, performed by a storage device according to an embodiment, of posting a completion entry and transmitting an interrupt. It is assumed that the processor 110 includes the first core 111 and the second core 112.

Referring to FIG. 5, the first queue CQ1a, the second queue CQ1b, and the third queue CQ1c of the first completion queue paired with the first submission queue SQ1 may be arranged in the memory 120, the L3 cache 13, and the L2 cache 11 of the first core 111, respectively, and the first queue CQ2a and the second queue CQ2b of the second completion queue paired with the second submission queue SQ2 may be arranged in the memory 120 and the L3 cache 13, respectively.

The storage device 200 may sequentially read the commands CMD1, CMD2, and CMD3 from the first submission queue SQ1 and execute the commands CMD1, CMD2, and CMD3, and may post the completion entries CE1, CE2, and CE3 indicating that the command execution has been completed to the first queue CQ1a, the second queue CQ1b, and the third queue CQ1c of the first completion queue.

The storage device 200 may transmit, to the first core 111, a first interrupt INT1a corresponding to the first completion entry CE1, a second interrupt INT2a corresponding to the second completion entry CE2, and a third interrupt INT3a corresponding to the third completion entry CE3.

The first interrupt INT1a and the second interrupt INT2a provided to the first core 111, which are cached interrupts, may include caching information indicating that the first completion entry CE1 and the second completion entry CE2 have been cached in the L2 cache 11 of the first core 111 and the L3 cache 13, respectively. For example, the caching information may be interrupt vector numbers allocated to the second queue CQ1b and the third queue CQ1c. The third interrupt INT3a provided to the first core 111, which is a non-cached interrupt, may include caching information indicating that the third completion entry CE3 has been written to the memory 120, for example, an interrupt vector number.

The storage device 200 may also sequentially read the commands CMD1, CMD2, and CMD3 from the second submission queue SQ2 and execute the commands CMD1, CMD2, and CMD3, and may post the completion entries CE1, CE2, and CE3 indicating that the command execution has been completed to a first queue CQ2a and a second queue CQ2b of the second completion queue.

The storage device 200 may transmit, to the second core 112, a first interrupt INT1b corresponding to the first completion entry CE1, a second interrupt INT2b corresponding to the second completion entry CE2, and a third interrupt INT3b corresponding to the third completion entry CE3.

The first interrupt INT1b provided to the second core 112, which is a cached interrupt, may include caching information indicating that the first completion entry CE1 has been cached in the L3 cache 13. For example, the caching information may be an interrupt vector number allocated to the second queue CQ2b. The second interrupt INT2b and the third interrupt INT3b provided to the second core 112, which are non-cached interrupts, may include caching information indicating that the second completion entry CE2 and the third completion entry CE3 have been written to the memory 120, for example, interrupt vector numbers, respectively.

Figure 6A:
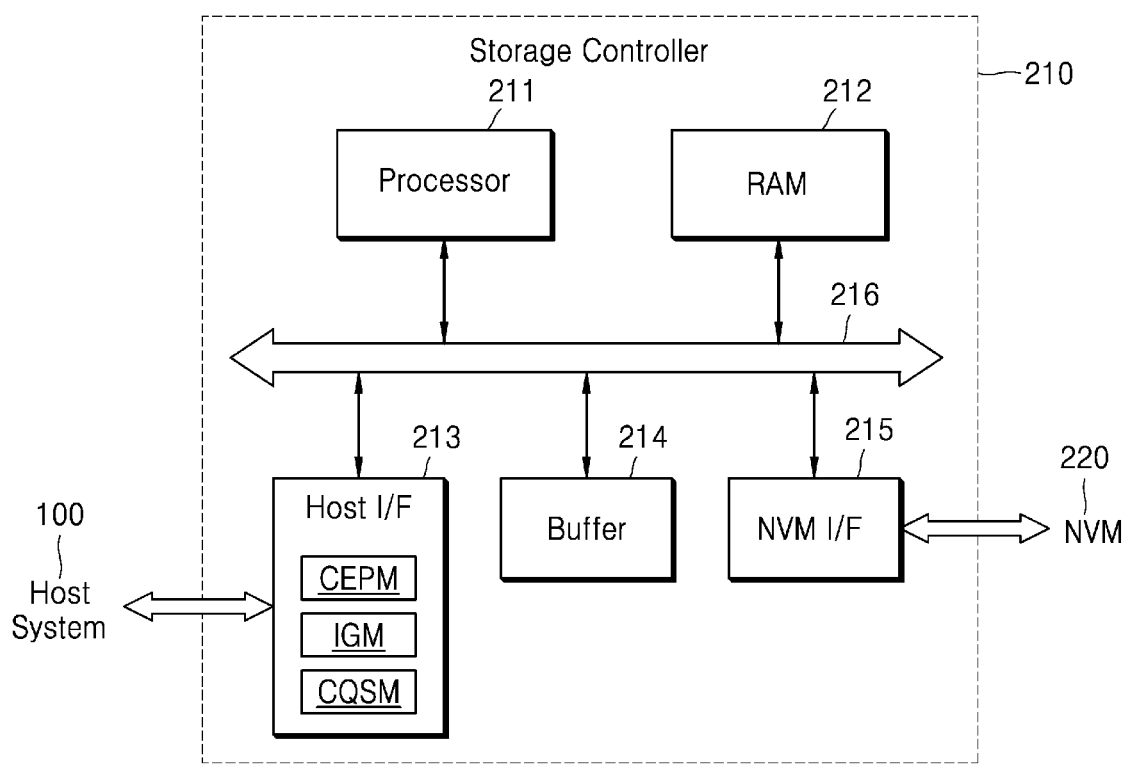
FIGS. 6A and 6B are schematic block diagrams of a storage controller according to an embodiment.
Figure 6B:
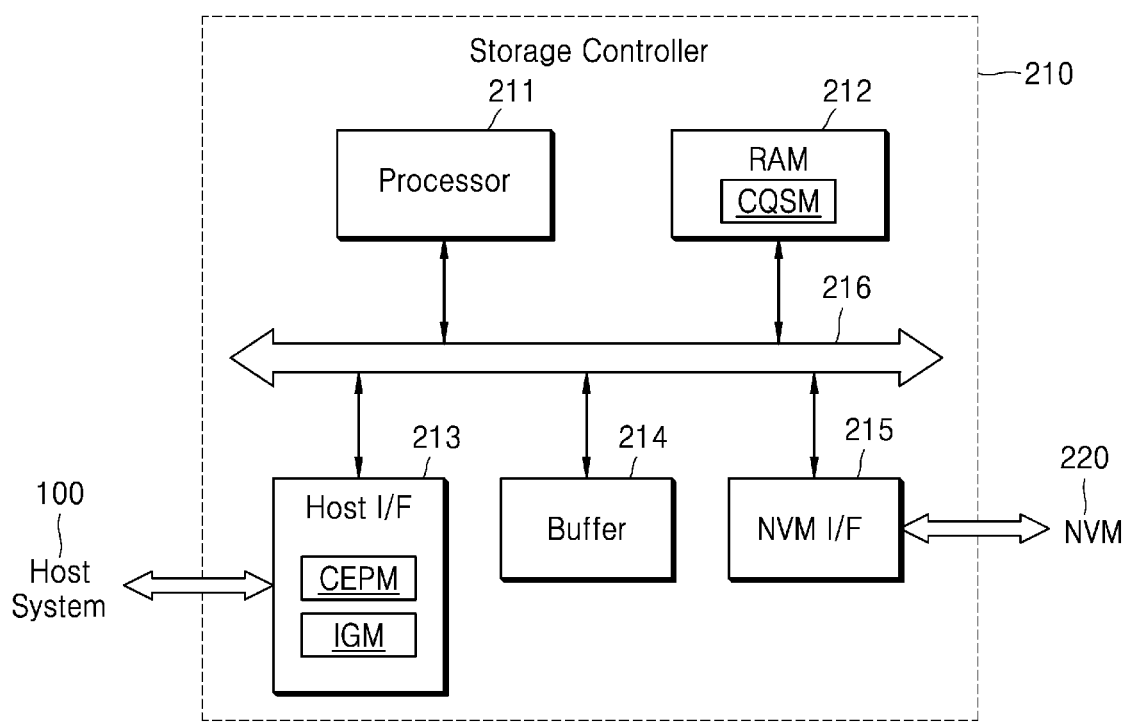

FIGS. 6A and 6B are schematic block diagrams of the storage controller 210 according to an embodiment.

Referring to FIGS. 6A and 6B, the storage controller 210 may include a processor 211, Random Access Memory (RAM) 212, a host interface (I/F) 213, a buffer 214, and an NVM I/F 215. These components may communicate with one another via a bus 216.

The processor 211 may include a CPU or a microprocessor, and may control the overall operation of the storage controller 210. According to an embodiment, the processor 211 may be implemented using a multi-core processor, for example, a dual core processor or a quad core processor.

The processor 211 may transmit, to the registers of the host I/F 213 and the NVM I/F 215, various pieces of control information necessary for read/write operations performed on the NVM 220. The processor 211 may operate according to firmware provided for various control operations of the storage controller 210. For example, the processor 211 may execute a garbage collection for managing the NVM 220 or an FTL for performing address mapping, wear leveling, and the like.

The RAM 212 may be used as an operation memory, a buffer memory, a cache memory, or the like. For example, the RAM 212 may be implemented as volatile memory, such as DRAM or SRAM, or non-volatile memory, such as PRAM, FRAM, or ReRAM. The RAM 212 may load software and/or firmware executed by the processor 211. For example, when the storage device 200 is booted, software and/or firmware may be loaded into the RAM 212 from the NVM 220.

The buffer 214 may temporarily store data that is to be written into the NVM 220 or data read from the NVM 220. The buffer 214 may be implemented as volatile memory, such as DRAM or SRAM, or non-volatile memory, such as PRAM, FRAM, or ReRAM.

The NVM I/F 215 may provide an interface between the storage controller 210 and the NVM 220. According to an embodiment, the number of NVM I/Fs 215 may correspond to the number of NVM chips included in the storage device 200 or the number of channels between the storage controller 210 and the NVM 220.

The host I/F 213 is configured to communicate with the host 100 under control by the CPU 211. At least one of various interface methods, such as Universal Serial Bus (USB), AT Attachment (ATA), Serial AT Attachment (SATA), Parallel AT Attachment (PATA), Serial Attached SCSI (SAS), High Speed Interchip (HSIC), Small Computer System Interface (SCSI), Peripheral Component Interconnection (PCI), PCI express (PCIe), Universal Flash Storage (UFS), Secure Digital (SD), MultiMedia Card (MMC), embedded MMC (eMMC), Dual In-line Memory Module (DIMM), Registered DIMM (RDIMM), Load Reduced DIMM (LRDIMM), Enhanced Small Disk Interface (ESDI), and Integrated Drive Electronics (IDE), is applicable to the host I/F 213.

The host I/F 213 may generate a completion entry, post the completion entry to the host 100, and transmit an interrupt corresponding to the completion entry to the host 100. According to an embodiment, the host I/F 213 may include a completion entry posting module CEPM, an interrupt generation module IGM, and a CQ steering module CQSM. According to an embodiment, the completion entry posting module CEPM, the interrupt generation module IGM, and the CQ steering module CQSM may be implemented as hardware circuits.

When execution of a command is completed, the CQ steering module CQSM may select a location in which a completion entry according to the command is to be written among a memory and at least one cache provided in the host 100. According to an embodiment, the CQ steering module CQSM may select a location to which the completion entry CE is to be posted, among the memory 120 and the at least one cache CC, based on latency according to the time for processing the completion entry CE. A detailed operation of the CQ steering module CQSM is described below with reference to FIG. 8.

According to an embodiment, the CQ steering module CQSM may be implemented as software or firmware, and, as shown in FIG. 6B, may be loaded into the memory 212. As the processor 211 executes instructions loaded into the memory 212, a function of the CQ steering module CQSM may be performed.

The completion entry posting module CEPM may transmit the completion entry to a completion queue included in the location selected by the CQ steering module CQSM. The completion entry may be transmitted to the host 100 in the form of a packet, for example, as a completion entry packet, and location information indicating locations where the completion entry is to be written, for example, the memory 120 and the at least one cache CC of the host 100 of FIG. 1, may be included in the header of the completion entry packet.

The interrupt generation module IGM generates an interrupt indicating that the completion entry has been posted. According to an embodiment, the interrupt generation module IGM may include an interrupt vector table, and may generate an interrupt corresponding to an entry, based on the interrupt vector table. The interrupt generation module IGM may generate a message signaled interrupt (MSI).

The interrupt may include information indicating a location where the completion entry is written, such as caching information indicating whether the completion entry has been cached and in which cache the completion entry has been cached. According to an embodiment, the caching information may be an interrupt vector number allocated to a completion queue included in the location where the completion entry is written. The interrupt may be transmitted to the host 100 in the form of a packet, for example, as an interrupt packet, and the caching information may be included in the header of the interrupt packet. The header of the interrupt packet may include location information indicating a core to which a plurality of core interrupts included in the processor 110 of the host 100 of FIG. 1 are to be transmitted.

Figure 7:
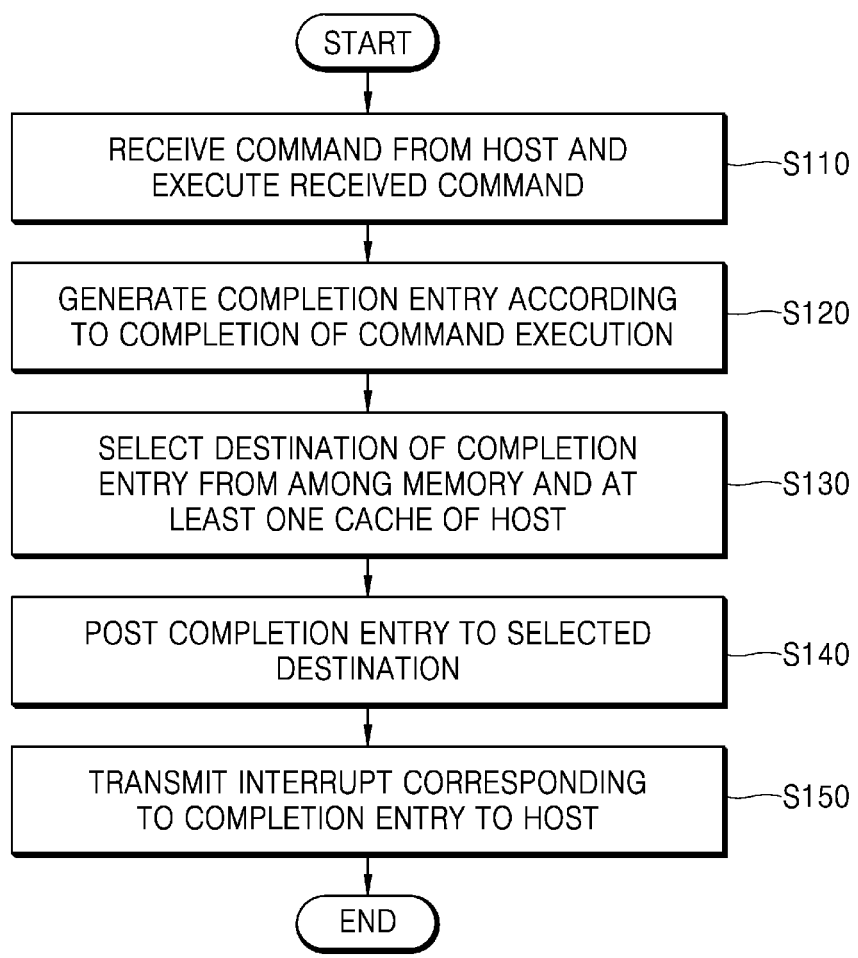
FIG. 7 is a flowchart of an operation of a storage device according to an embodiment.

FIG. 7 is a flowchart of an operation of a storage device according to an embodiment. The operation of FIG. 7 may be performed by the storage controller 210 of the storage device 200 of FIG. 1.

Referring to FIG. 7, the storage controller 210 may receive a command from a host and execute the received command (S110). According to an embodiment, the storage controller 210 may include a command queue, and the command may be written to the command queue. The storage controller 210 may schedule the execution of the command.

The storage controller 210 may generate a completion entry according to completion of the command execution (S120). The completion entry may include, for example, whether an operation according to the command has been normally performed.

The storage controller 210 may select a destination of the completion entry from among a memory and at least one cache of the host 100 of FIG. 1 (S130). The storage controller 210 may select the destination of the completion entry, that is, a location where the completion entry is to be posted, based on the latency according to the time for processing the completion entry.

The storage controller 210 may post the completion entry to the selected destination (S140). The storage controller 210 may transmit, to the host 100, a completion entry packet including location information indicating the destination of the completion entry and the completion entry. For example, the storage controller 210 may transmit the completion entry packet to the root complex 130a of the host 100a of FIG. 2, and the root complex 130a may write the completion entry to the memory or the at least one cache, based on the location information included in the header of the completion entry packet.

The storage controller 220 may transmit an interrupt corresponding to the completion entry to the host 100 (S150). The interrupt may be implemented as an interrupt packet including caching information indicating whether the completion entry has been cached and in which cache the completion entry has been cached. As described above with reference to FIGS. 1 through 5, interrupt vector numbers may be allocated to completion queues included in one completion queue (e.g., logically one completion queue) corresponding to at least one submission queue and provided in different locations (e.g., a memory, an L2 cache, and an L3 cache), respectively, and the caching information may include an interrupt vector number allocated to a completion queue included in the destination of the completion entry.

The host 100 may determine whether the completion entry has been cached and whether the completion entry needs to be processed preferentially, based on the interrupt vector number, and may determine the processing order of completion entries. The host 100 may process the completion entry written to the completion queue corresponding to the interrupt vector number, based on the interrupt vector number.

Figure 8:
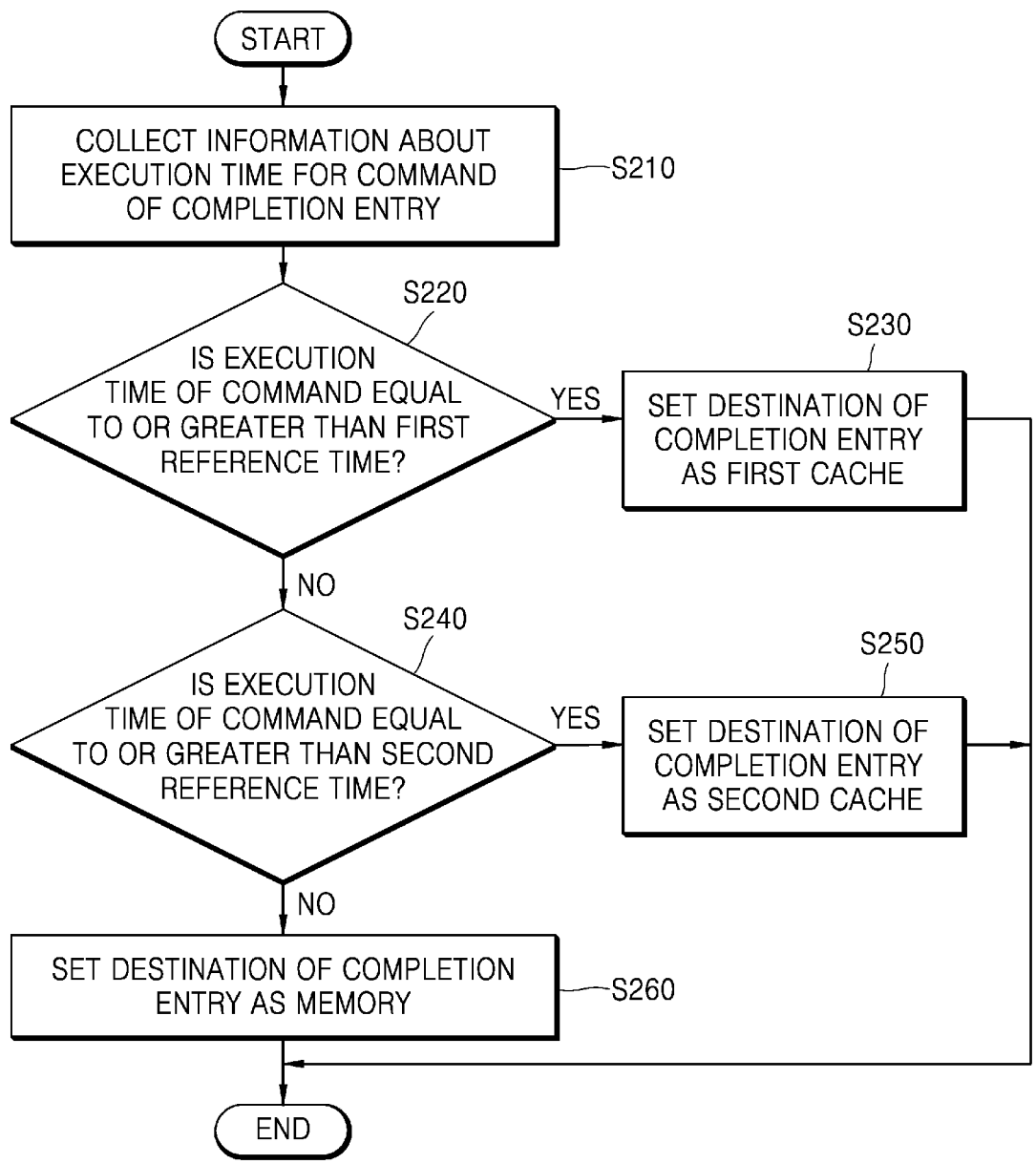
FIG. 8 is a flowchart of an operation of a storage device according to an embodiment.

FIG. 8 is a flowchart of an operation of a storage device according to an embodiment. In detail, FIG. 8 illustrates a method, performed by the CQ steering module CQSM included in the storage controller 210 of FIG. 1, of determining the destination of the completion entry.

Referring to FIG. 8, the CQ steering module CQSM may collect information about the execution time for the command of the completion entry (S210). For example, when the command requests the NVM 220 of FIG. 1 to write data, the CQ steering module CQSM may check the execution time for a time from when the command is written to a command queue and executed to when data writing to the NVM 220 is completed.

The CQ steering module CQSM may determine whether the execution time of the command is equal to or greater than a first reference time (S220). According to an embodiment, the first reference time may be set based on the target latency of the command, and, for example, may correspond to 80% of the target latency.

When the execution time of the command is equal to or greater than the first reference time (S220—YES), the CQ steering module CQSM may set the destination of the completion entry as a first cache (S230). According to an embodiment, the first cache may be a dedicated cache of a core, for example, an L2 cache.

When the execution time of the command is less than the first reference time (S220—NO), the CQ steering module CQSM may determine whether the execution time of the command is equal to or greater than a second reference time (S240). According to an embodiment, the second reference time may be set based on the target latency of the command, and may be less than the first reference time. For example, the second reference time may correspond to 60% of the target latency.

When the execution time of the command is equal to or greater than the second reference time (S240—YES), the CQ steering module CQSM may set the destination of the completion entry as a second cache (S250). According to an embodiment, the second cache may be a sharing cache between cores, for example, an L3 cache.

When the execution time of the command is less than the second reference time (S240—NO), the CQ steering module CQSM may set the destination of the completion entry as a memory (S260). As such, the CQ steering module CQSM may set the destination of the completion entry, based on the execution time of the command, and may select a storage region close to a core, that is, a fast-accessible cache of the core, as the destination of the completion entry so that, as the execution time increases, the completion entry corresponding to the command may be preferentially processed by the host 100 of FIG. 1. Accordingly, the completion entry may be quickly processed even when the execution time of the command is long, and thus, the completion latency of the command (the time from when the command is issued to when the completion entry is processed) may be reduced.

Figure 9:
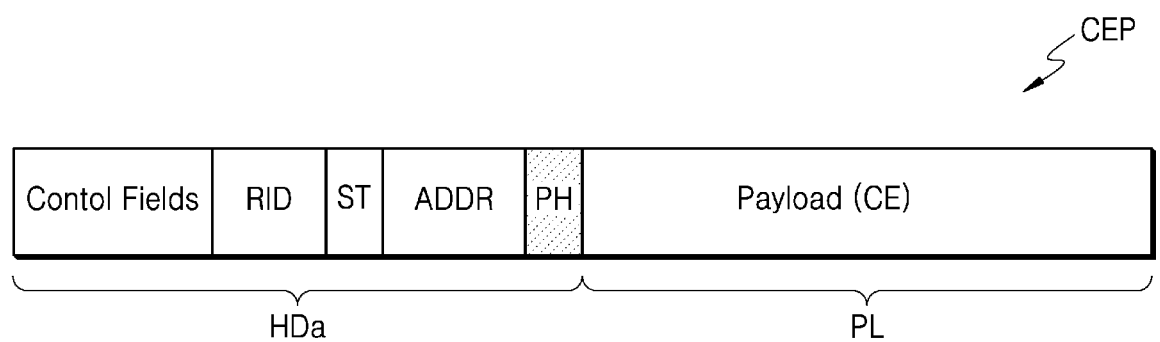
FIG. 9 illustrates a completion entry packet that is transmitted by a storage device according to an embodiment.

FIG. 9 illustrates a completion entry packet that is transmitted by a storage device according to an embodiment. FIG. 9 illustrates a PCIe-based packet.

As shown in FIG. 9, a completion entry packet CEP may include a header HDa and a payload PL. The payload PL may include the completion entry CE. The header HDa may include a plurality of fields, for example, control fields, a requester ID (RID), a steering tag (ST), an address ADDR, and a processing hint (PH). The control fields may include control values indicating the size of the header, the nature of the packet, existence or non-existence of an optionally used CRC, an address processing method, the size of the payload PL, and the like. The RID may include an ID allocated to of a device that transmitted a packet, the ST indicates a core to process data of the packet, for example, the completion entry C3, among a plurality of cores included in the processor 110 of FIG. 1, and the address ADDR indicates a location in the host 100 of FIG. 1 to which the data of the packet recognized by the host 100 of FIG. 1 is to be transmitted. The PH may include location information indicating the destination of the completed entry. For example, when the PH is set to be '00', the PH may indicate the memory 120 of FIG. 1, when the PH is set to be '01', the PH may indicate the L2 cache, and, when the PH is set to be '10', the PH may indicate the L3 cache. According to an embodiment, the header HDa may be implemented as 16-byte data, namely, 4 double words (DWs), including the control fields, the RID, the ST, the address ADDR, and the PH.

Figure 10:
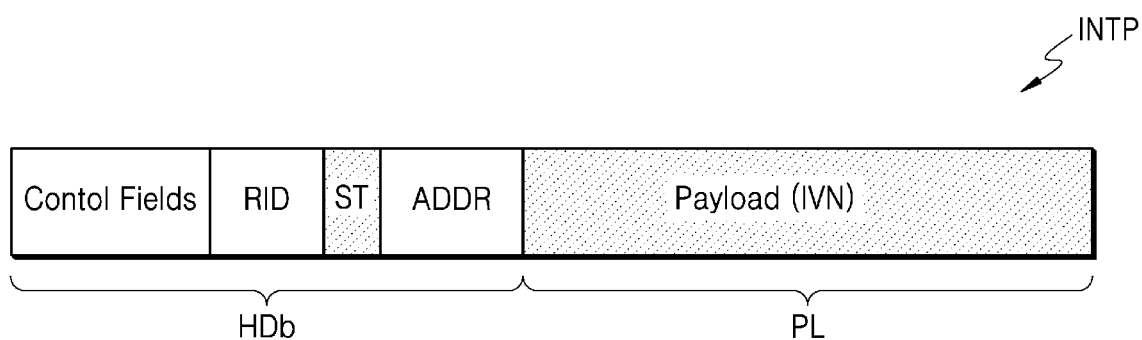
FIG. 10 illustrates an interrupt packet that is transmitted by a storage device according to an embodiment.

FIG. 10 illustrates an interrupt packet that is transmitted by a storage device according to an embodiment. FIG. 10 illustrates a PCIe-based packet.

As shown in FIG. 10, an interrupt packet INTP may include a header HDb and a payload PL. The header HDb may include a plurality of fields, for example, control fields, an RID, and an ST. According to an embodiment, the header HDb may be implemented as 8 bytes of data. The ST indicates a core to which packet data, for example, an interrupt, is to be transmitted among the plurality of cores included in the processor 110 of FIG. 1, and the payload PL may include an interrupt vector number INV. The interrupt may be transmitted to a core corresponding to the interrupt, based on the ST, and the core may determine whether a completion entry has been cached and in which cache the completion entry has been cached, based on the interrupt vector number INV of the payload PL.

Figure 11:
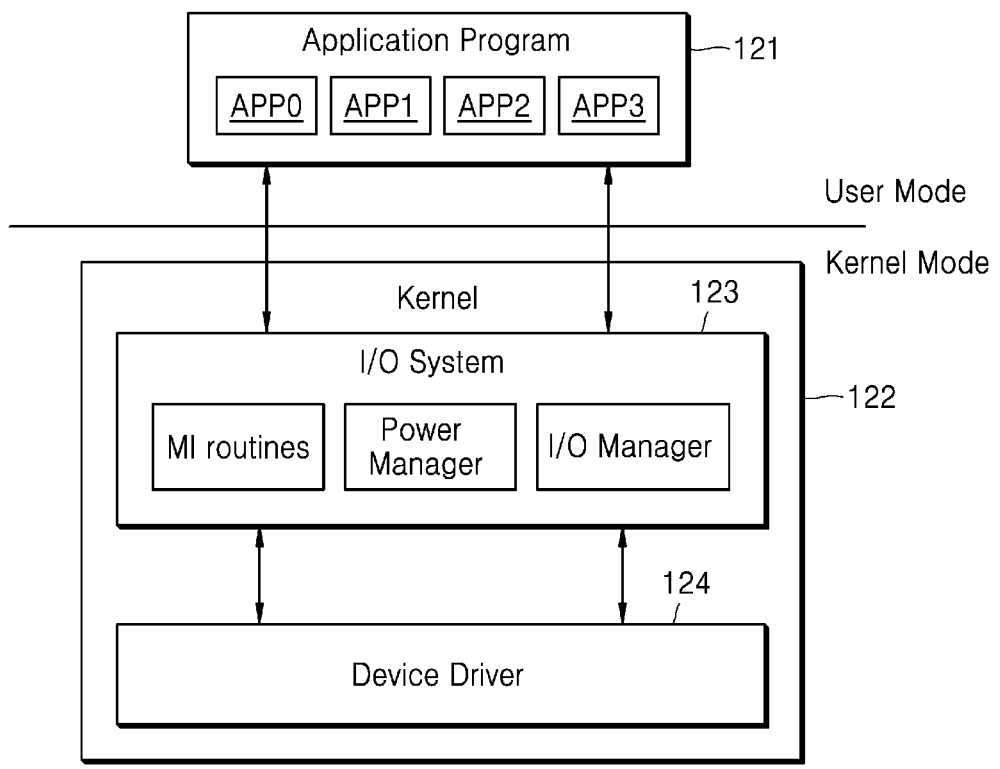
FIG. 11 is a schematic block diagram of a software structure of a host according to an embodiment.

FIG. 11 is a schematic block diagram of a software structure of a host according to an embodiment.

Referring to FIG. 11, the software of the host 100 may briefly include application programs 121 executed in a user mode and a kernel 122 executed in a kernel mode, and the kernel 122 may include an input/output (I/O) system 12e and a device driver 124. Although not shown in FIG. 11, a file system may be executed in the kernel mode. After the software of the host 100 is loaded into the memory 120 of FIG. 1, the software may be executed by the processor 110.

The application programs 121 are software of an upper layer that is driven as a basic service or driven by the host 100 of FIG. 1 according to a user's request. A plurality of application programs APP0, APP1, APP2, and APP3 may be executed to provide various services.

For example, when a user requests that a moving picture file is reproduced, an application program for playing a moving picture back may be executed. The executed application program may generate a read request to the storage device 200 of FIG. 1 to play the moving picture file requested by the user, and a command for the read request may be written to a submission queue. The storage device 200 fetches the command from the submission queue and executes the fetched command.

The kernel 122, which is a core program on which the components of an OS depend, is used to access hardware components and book processes and schedules to be executed on the host 100, and manages interactions between the application programs 121 and hardware.

The I/O system 123 variously controls various I/O devices, for example, the storage device 200. The I/O system 123 may include management instrumentation (MI) routines, a power manager, an I/O manager, and the like.

The device driver 124 is a control module for controlling an I/O device, for example, the storage device 200, at an OS level. When an access request to the storage device 200 is generated by the user or from the application programs 121, the device driver 124 is called. The device driver 124 may be provided as a software module of a kernel for controlling the storage device 200.

According to an embodiment, on an initialization stage, the device driver 124 may generate a submission queue and a completion queue, generate completion queues to the memory 200 of FIG. 1 and the at least one cache CC of the host 100 of FIG. 1, and allocate interrupt vector numbers to the completion queues, respectively. According to an embodiment, the device driver 124 may read an ST from a packet, for example, the completion entry packet CEP of FIG. 9 and the interrupt packet INTP of FIG. 10 and may read a PH from the completion entry packet CEP.

Figure 12A:
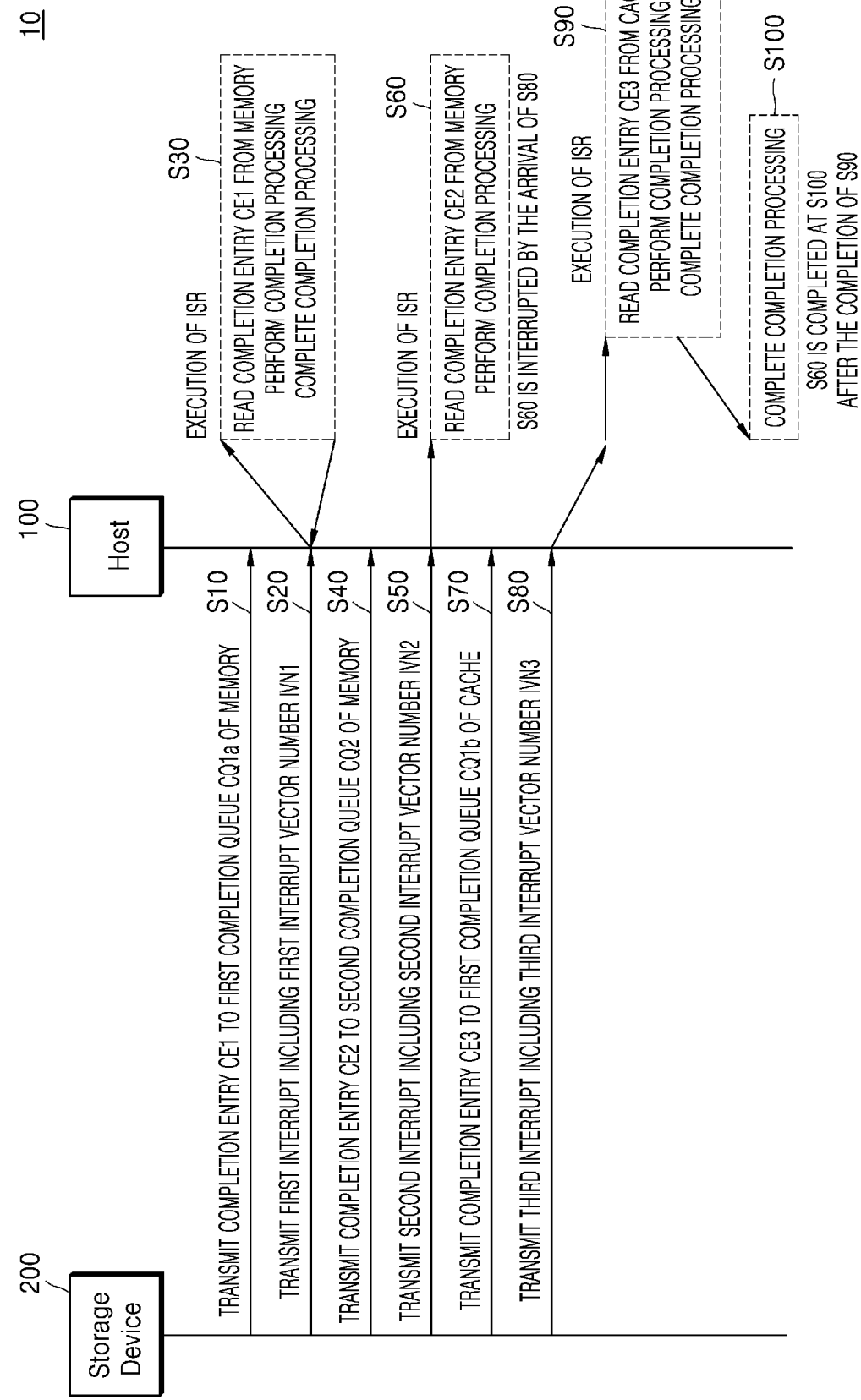
FIG. 12A illustrates completion entry processing carried out by an electronic system according to an embodiment.
Figure 12B:
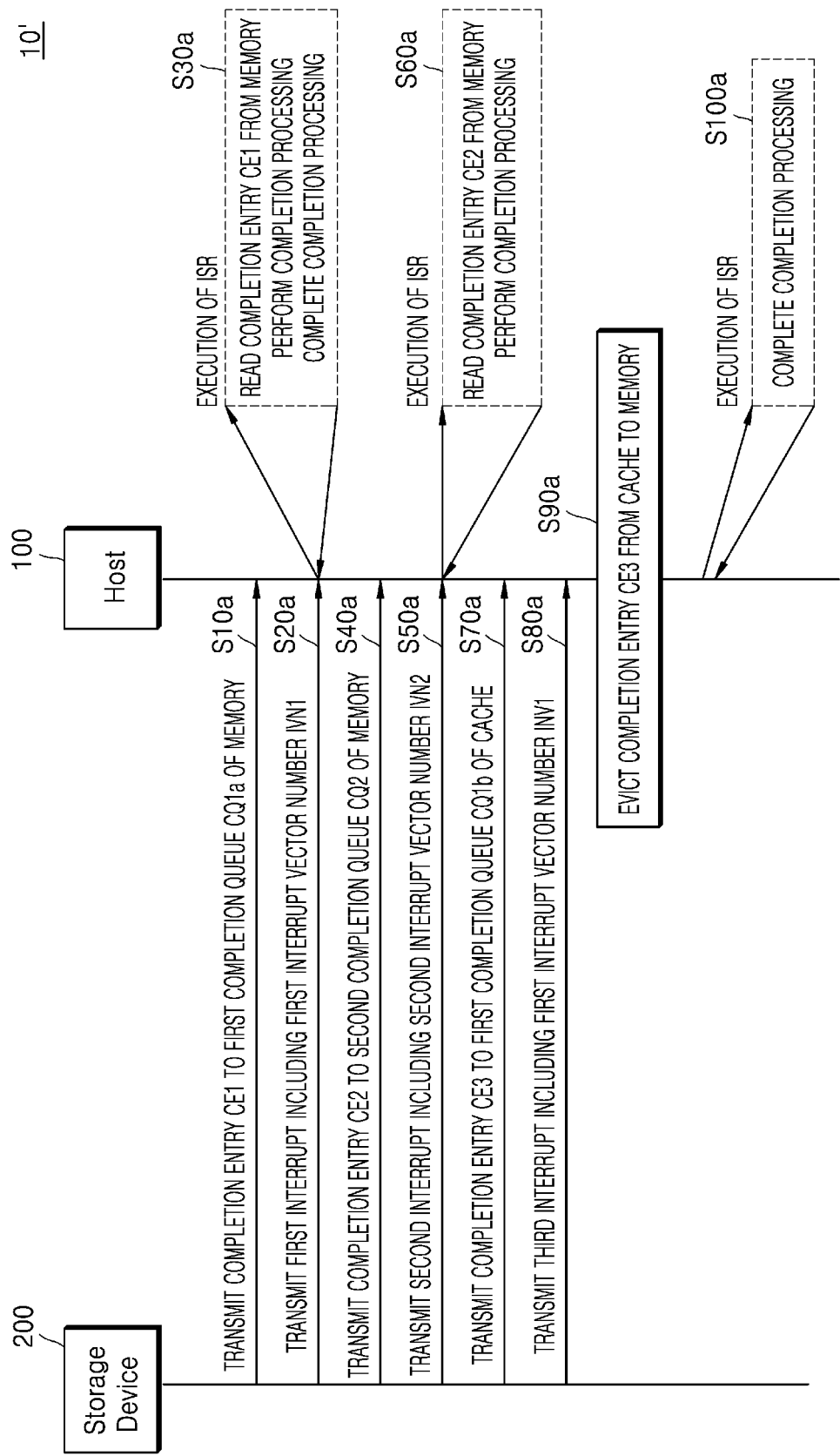
FIG. 12B illustrates completion entry processing carried out by an electronic system according to a comparative example.

FIG. 12A illustrates completion entry processing carried out by the electronic system 10 according to an embodiment, and FIG. 12B illustrates completion entry processing carried out by an electronic system 10' according to a comparative example.

The storage device 200 may execute a command from the host 100, transmit a completion entry CE indicating that execution of the command has been completed to a location selected among a memory or at least one cache included in the host 100, and transmit an interrupt indicating transmission of the completion entry CE to the host 100.

For example, as shown in FIG. 12A, the storage device 200 may transmit (post) the completion entry CE1 to the first completion queue CQ1a of the memory (S10). The storage device 200 may transmit a first interrupt including the first interrupt vector number IVN1 to the host 100 (S20). The first interrupt vector number IVN1, which is an interrupt vector number allocated to the first completion queue CQ1a, may indicate that the completion entry CE1 has been posted to the first completion queue CQ1a of the memory. The first interrupt may be transmitted to a core, and the core may execute an interrupt service routine (ISR) (S30). For example, the core may read the completion entry CE1 from the memory, may perform completion processing, and may complete the completion processing. When the ISR is completed, the core may perform processing that has been executed before the first interrupt is transmitted.

Next, the storage device 200 may transmit the completion entry CE2 to the second completion queue CQ2 of the memory (S40). The storage device 200 may transmit a second interrupt including the second interrupt vector number IVN2 to the host 100 (S50). The second interrupt vector number IVN2, which is an interrupt vector number allocated to the second completion queue CQ2, may indicate that the completion entry CE2 has been posted to the second completion queue CQ2. The second interrupt may be transmitted to a core, and the core may execute an ISR (S60).

The storage device 200 may transmit the completion entry CE3 to the first completion queue CQ1b of the cache (S70), and may transmit the third interrupt including the third interrupt vector number INV3 to the host 100 (S80). The third interrupt vector number IVN3, which is an interrupt vector number allocated to the first completion queue CQ1b, may indicate that the completion entry CE3 has been cached in the first completion queue CQ1b of the cache.

The cached interrupt may have a higher priority than a non-cached interrupt. When the core performs an ISR in correspondence with the second interrupt, in response to the third interrupt indicating that the completion entry CE3 has been cached, the core may temporarily suspend execution of the ISR corresponding to the second interrupt, and may execute an ISR corresponding to the third interrupt (S90). Thus, in FIG. 12A, completion of S60 is interrupted by the arrival of S80. The core may read the completion entry CE3 from the cache, perform completion processing according to the completion entry CE3, and then complete the completion processing. Thus, in FIG. 12A, completion of S60 occurs after completion of S90.

When the ISR corresponding to the third interrupt is completed, the core may continue to execute the ISR corresponding to the second interrupt to complete the completion processing (S100).

Processing of completion entries by the electronic system 10' according to a comparative example will be described with reference to FIG. 12B. In the electronic system 10' according to a comparative example, completion queues included in one completion queue may be generated in a memory and a cache, respectively, but the same interrupt vector number may be allocated to the completion queues respectively included in the memory and the cache. In other words, even when one completion queue is physically placed in a plurality of locations, the same interrupt vector number may be allocated.

Because operations S10a, S20a, S30a, S40a, S50a, and S60a are the same as operations S10 through S60 of FIG. 12A, overlapping descriptions will be omitted.

The storage device 200 may transmit the completion entry CE3 to the first completion queue CQ1b of the cache (S70a), and may transmit the third interrupt including the first interrupt vector number INV1 to the host 100 (S80a). The first interrupt vector number INV1 is allocated to the first completion queues CQ1a and CQ1b.

Processing of the completion entry CE3 may be delayed, and the completion entry CE3 may be evicted from the cache to the memory (S90a). For example, while the ISR according to the second interrupt is executed in operation S60a, processing of the completion entry CE3 may be delayed.

After the ISR according to the second interrupt is completed, the core may execute the ISR according to the third interrupt (S100a). The core may read the completion entry CE3 from the memory, perform the completion processing, and then complete the ISR.

The time taken for the core to access memory may be longer than the time taken to access the cache. Accordingly, like a completion entry processing method performed by the electronic system 10' according to the comparative example of FIG. 12B, when the completion entry CE3 is not processed when it is stored in the cache, and, when the completion entry CE3 is processed after being evicted to the memory, latency may increase.

However, in the completion entry processing method performed by the electronic system 10 according to an embodiment described with reference to FIG. 12A, the core may determine whether the completion entry has been cached and in which cache the completion entry has been cached, based on the interrupt vector number included in the interrupt, and, when the completion entry is cached, may preferentially process the completion entry. As such, as the processing order of completion entries is adjusted, occurrence of a bottleneck in processing of the completion entries may be prevented, and I/O latency may be optimized.

Figure 13:
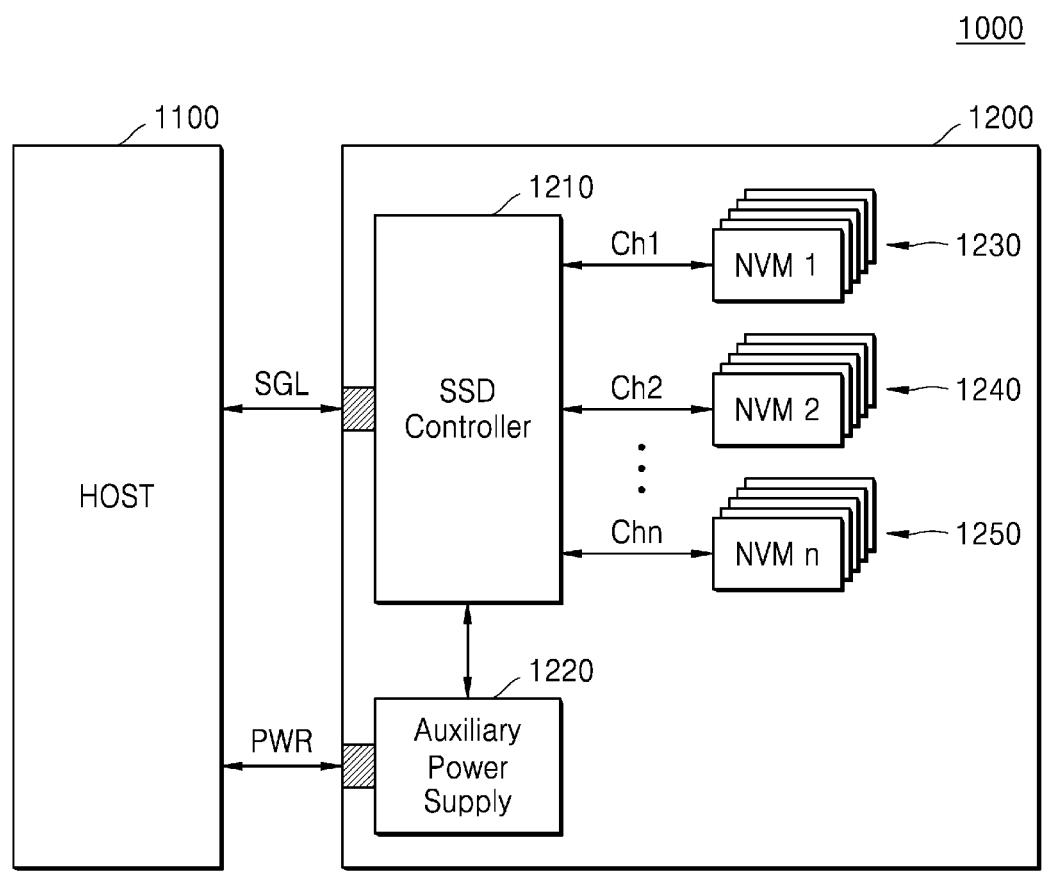
FIG. 13 is a block diagram of a solid state drive (SSD) system according to an embodiment.

FIG. 13 is a block diagram of an SSD system 1000 according to an embodiment.

The SSD system 1000 may be included in a data center including several tens of host machines or servers that perform several hundreds of virtual machines. For example, the SSD system 1000 may be a computing device, such as a laptop computer, a desktop computer, a server computer, a workstation, a portable communication terminal, a PDA, a PMP, a smartphone, or a tablet PC, a virtual machine, or its virtual computing device. Alternatively, the SSD system 1000 may be some of the components included in a computing system such as a graphics card. The SSD system 1000 is not limited to a hardware configuration described below, and other configurations are possible.

Referring to FIG. 13, the SSD system 1000 may include a host 1100 and an SSD 1200.

The host 1100 may refer to a data processing device capable of processing data. The host 1100 may perform an OS and/or various applications. The host 1110 may include a CPU, a graphics processing unit (GPU), a neural processing unit (NPU), a digital signal processor (DSP), a microprocessor, or an AP. The host 1100 may include one or more processors and main memory (e.g., DRAM). As described above, completion queues may be created in a cache and a main memory included in one or more processors, and interrupt vector numbers may be allocated to the completion queues, respectively.

The host 1100 may communicate with the SSD 1200 by using various protocols. For example, the host 1100 may communicate with the SSD 1200 by using an interface protocol, such as Peripheral Component Interconnect-Express (PCI-E), Advanced Technology Attachment (ATA), Serial ATA (SATA), Parallel ATA (PATA), or serial attached SCSI (SAS). Various other interface protocols, such as a Universal Flash Storage (UFS), a Universal Serial Bus (USB), a Multi-Media Card (MMC), an Enhanced Small Disk Interface (ESDI), and Integrated Drive Electronics (IDE), may be applied to a protocol between the host 1100 and the SSD 1200.

The SSD 1200 may be implemented as an NVMe SSD using a PCIe bus-based CDMA. The SSD 1200 communicates with the host 1100 through a signal via a signal connector and receives power via a power connector. The SSD system 1200 may include an SSD controller 1210, an auxiliary power supply 1220, and memory devices 1230, 1240, and 1250. The plurality of memory devices 1230, 1240, and 1250 may be NAND flash memory devices.

The storage controllers 210 described above with reference to FIGS. 6A and 6B are applicable as the SSD controller 1210. The SSD controller 1210 may include a CQ steering module CQSM, and the CQ steering module CQSM may select a location to which a completion entry is to be written, from among at least one cache and a memory of the host 1100. The SSD controller 1210 may post the completion entry to the completion queue included in the selected location, and may transmit to the host 1100 an interrupt indicating that the completion entry has been posted to the selected location. The interrupt may be implemented as an MSI, and may include an interrupt vector number allocated to the completion queue to which the completion entry has been written.

A processor of the host 1100 may determine whether the completion entry has been cached based on the interrupt vector number included in the interrupt, and may determine the processing order of the completion entry. For example, the host 1100 may process the cached completion entry in preference to a non-cached completion entry.

Figure 14:
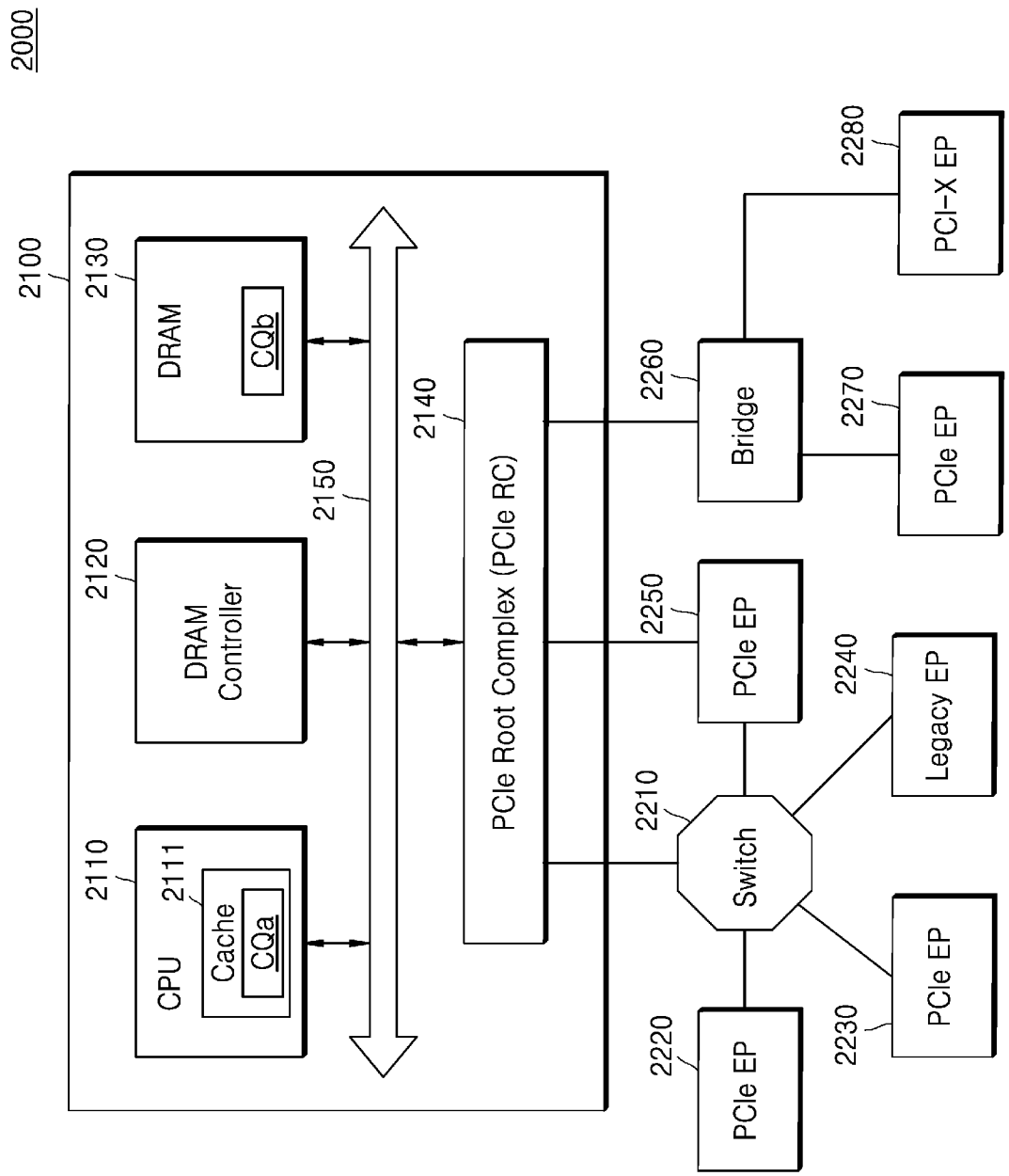
FIG. 14 is a block diagram of a computing system according to an embodiment.

FIG. 14 is a block diagram of a computing system 2000 according to an embodiment.

Referring to FIG. 14, the computing system 2000 may include PCIe interface-based I/O hierarchies. The computing system 2000 may include a CPU 2110, a DRAM controller 2120, a DRAM 2130, a PICe RC 2140, a switch 2210, a bridge 2260, and a plurality of end points (EPs), and the plurality of EPs may include a plurality of PCIe EPs 2220, 2230, 2250, and 2270, a legacy EP 2240, and a PCI-X EP 2280. Configurations of the EPs may vary.

The CPU 2110, the DRAM controller 2120, the DRAM 2130, and the PICe RC 2140 may be included in the host 2100, and may communicate with one another via a PCIe-based system bus 2150.

The host 2100 is applicable to the host 100 of FIG. 1. Completion queues CQa and CQb may be generated in at least one cache 2111 of the CPU 2110 and the DRAM 2130, and interrupt vector numbers may be allocated to the completion queues CQa and CQb, respectively. The completion queues CQa and CQb may be paired with one submission queue.

The PICe RC 2140 connects the host 2100 to the plurality of EPs. The PCIe RC 2140 may interpret TLPs from the plurality of EPs and transmit corresponding signals to corresponding devices, for example, the CPU 2110 or the DRAM 2130.

The PCIe RC 2140 may be directly connected to the EPs or may be indirectly connected to the EPs through the switch 2210 or the bridge 2260. Referring to FIG. 14, the PCIe RC 2140 may be connected to the PCIe EPs 2220 and 2230 and the legacy EP 2240 via the switch 2210. The PCIe RC 2140 may be directly connected to the PCIe EP 2250, or may be connected to the PCIe EP 2270 and the PCI-X EP 2280 via the bridge 2260.

The switch 2210 and the bridge 2260 are devices capable of connecting the plurality of EPs to the PCIe RC 2140. The switch 2210 may process a packet transmitted/received by hardware, and the bridge 2260 may process a packet transmitted/received by software. The switch 2210 and the bridge 2260 may include downstream ports and upstream ports. In FIG. 14, the switch 2210 is connected to the two PCIe EPs 2220 and 2230 and the one legacy EP 2240. In this case, the two PCIe EPs 2220 and 2230 and the one legacy EP 2240 may be connected to the downstream port of the switch 2210, and the PCIe RC 2140 may be connected to the upstream port of the switch 2210.

The EPs 2220, 2230, 2240, 2250, 2270, and 2280, the switch 2210, and the bridge 2260 connected to the PCIe RC 2140 form one hierarchy. EPs may be storage devices such as an SSD and a USB or peripheral devices such as a graphics device, as a subject of a transaction. The EPs 2220, 2230, 2240, 2250, 2270, and 2280 may initiate a transaction as a requester or may respond to the transaction as a completer. The EPs 2220, 2230, 2240, 2250, 2270, and 2280 may be devices or components located at the bottom of the I/O hierarchy connected to the CPU 2110 and the memory 2130.

At least one EP, for example, the PCIe EP 2220, among the plurality of PCIe EPs 2220, 2230, 2250, and 2270 may execute a command from the CPU 2110, generate a completion entry representing a result of the execution of the command, and select a location to which the completion entry is to be written from among the at least one cache 2111 and the DRAM 2130. The PCIe EP 2220 may post the completion entry to a completion queue included in the selected location, for example, the completion queue CQa or the completion queue CQb. The PCIe EP 2220 may transmit, to the CPU 2110, an interrupt indicating whether the completion entry is cached. The interrupt may include an interrupt vector number allocated to the completion queue to which the completion entry is written.

The PCIe RC 2140 may read location information from the header of a completion entry packet received from the PCIe EP 2220, and may transmit the completion entry to the selected location, for example, the at least one cache 2111 or the DRAM 2130. The PCIe RC 2140 may read location information (e.g., an ST) from the header of an interrupt packet, and may transmit the interrupt to a corresponding core among a plurality of cores included in the CPU 2110. The core may determine whether the completion entry has been cached (and in which cache the completion entry has been cached), based on the interrupt vector number of the interrupt, and may determine the processing order of the completion entry. For example, when the completion entry is cached, the core may preferentially process the completion entry.

While various example embodiments have been particularly shown and described, it will be understood that various changes in form and detail may be made therein without departing from the spirit and scope of the following claims.

What is claimed is:

1. A storage device comprising:
a non-volatile memory device; and
a storage controller configured to:
control the non-volatile memory device,
execute a command from a host,
select a location to which a completion entry for the command is to be written from among a memory and at least one cache of the host, and
transmit, to the host, an interrupt comprising an interrupt vector number indicating the location to which the completion entry is to be written.

2. The storage device of claim 1, wherein the storage controller is further configured to transmit, to the host, a completion entry packet comprising location information for the location to which the completion entry for the command is to be written.

3. The storage device of claim 2, wherein a header of the completion entry packet comprises a processing hint field that comprises the location information.

4. The storage device of claim 1, wherein the storage controller is further configured to transmit, to the host, an interrupt packet comprising a payload, and
wherein the payload comprises the interrupt vector number.

5. The storage device of claim 4, wherein a header of the interrupt packet comprises a steering tag indicating a corresponding core among a plurality of cores of the host.

6. The storage device of claim 1, wherein the storage controller is further configured to:
based on the completion entry being written to the at least one cache, transmit, to the host, a cached interrupt indicating that the completion entry has been cached; and
based on the completion entry being written to the memory, transmit, to the host, a non-cached interrupt indicating that the completion entry has not been cached.

7. The storage device of claim 6, wherein the cached interrupt has a priority that is higher than a priority of the non-cached interrupt.

8. The storage device of claim 1, wherein the storage controller further is configured to select the location to which the completion entry is to be written, based on an execution time of the command, and
wherein the command corresponds to the completion entry.

9. The storage device of claim 1, wherein the at least one cache comprises at least one of respective dedicated caches of a plurality of cores included in the host or a sharing cache shared by the plurality of cores.

10. The storage device of claim 1, wherein the storage controller comprises an interface circuit configured to transmit the interrupt to the host, based on a Peripheral Component Interconnect Express (PCIe) interface.

11. A storage device comprising:
a non-volatile memory device; and
a storage controller configured to:
control the non-volatile memory device,
execute a command from a host,
transmit, to the host, a completion entry packet that comprises location information for a location to which a completion entry for the command is to be written among a memory and at least one cache of the host and the completion entry, and
transmit, to the host, an interrupt packet comprising caching information indicating whether the completion entry has been cached in one of the at least one cache.

12. The storage device of claim 11, wherein the caching information comprises an interrupt vector number allocated to a completion queue included in the location to which the completion entry is to be written.

13. The storage device of claim 11, wherein the storage controller is further configured to select the location to which the completion entry is to be written, based on execution time of the command corresponding to the completion entry.

14. The storage device of claim 13, wherein the storage controller is further configured to:
based on the execution time being equal to or greater than a reference time, select the at least one cache as the location to which the completion entry is to be written, and
based on the execution time being less than the reference time, select the memory as the location to which the completion entry is to be written.

15. The storage device of claim 11, wherein the storage controller is further configured to generate the completion entry packet and the interrupt packet according to a non-volatile memory express (NVMe) protocol.

16. An electronic system comprising:
a host comprising a processor and a memory, the processor comprising a plurality of cores and at least one cache; and
a storage device comprising a non-volatile memory,
wherein the storage device is configured to:
execute a command from the host,
select a location to which a completion entry for the command is to be written from among the memory and the at least one cache, and
transmit, to the host, an interrupt comprising an interrupt vector number allocated to a completion queue included in the location to which the completion entry is to be written.

17. The electronic system of claim 16, wherein the storage device is configured to:
based on execution time of the command being equal to or greater than a reference time, select the at least one cache as the location to which the completion entry is to be written, and
based on the execution time of the command being less than the reference time, select the memory as the location to which the completion entry is to be written.

18. The electronic system of claim 16, wherein the storage device is further configured to transmit, to the host, a completion entry packet comprising a processing hint field that comprises location information for the location to which the completion entry for the command is to be written.

19. The electronic system of claim 16, wherein the storage device is further configured to transmit, to the host, an interrupt packet that comprises the interrupt vector number and information for a core to which the interrupt is to be transmitted among the plurality of cores.

20. The electronic system of claim 16, wherein the host and the storage device are configured to communicate with each other based on a Peripheral Component Interconnect Express (PCIe) interface.

* * * * *